US011063470B2

United States Patent
Ansett

(10) Patent No.: US 11,063,470 B2
(45) Date of Patent: Jul. 13, 2021

(54) ADAPTABLE REDUNDANT POWER

(71) Applicant: Edward Michael John Ansett, Cheltenham (GB)

(72) Inventor: Edward Michael John Ansett, Cheltenham (GB)

(*) Notice: Subject to any disclaimer, the term of this patent is extended or adjusted under 35 U.S.C. 154(b) by 0 days.

(21) Appl. No.: 16/653,157

(22) Filed: Oct. 15, 2019

(65) Prior Publication Data

US 2020/0127491 A1    Apr. 23, 2020

Related U.S. Application Data

(60) Provisional application No. 62/746,796, filed on Oct. 17, 2018.

(51) Int. Cl.
*H02J 9/06* (2006.01)
*G06F 1/30* (2006.01)
*G06F 1/26* (2006.01)

(52) U.S. Cl.
CPC .......... *H02J 9/061* (2013.01); *G06F 1/263* (2013.01); *G06F 1/30* (2013.01); *H02J 9/068* (2020.01)

(58) Field of Classification Search
CPC ...... H02J 9/00; H02J 9/06; H02J 9/061; H02J 2009/061; G06F 1/26; G06F 1/30; G06F 1/263
USPC ............... 307/23, 22, 24, 26, 28, 30, 64, 66
See application file for complete search history.

(56) References Cited

U.S. PATENT DOCUMENTS

| | | | |
|---|---|---|---|
| 8,067,857 B2 | 11/2011 | Humphrey et al. | |
| 8,278,997 B1* | 10/2012 | Kim | G06F 1/26 327/541 |
| 8,522,077 B2 | 8/2013 | Horvath et al. | |
| 8,671,287 B2 | 3/2014 | DeCusatis et al. | |
| 9,122,471 B2 | 9/2015 | Henise, IV et al. | |
| 9,923,414 B2 | 3/2018 | Ahdoot | |
| 2010/0264739 A1* | 10/2010 | Errington | H02J 1/10 307/80 |

(Continued)

FOREIGN PATENT DOCUMENTS

| CN | 107863817 A | 12/2017 |
|---|---|---|
| WO | 2017023670 A1 | 2/2017 |

OTHER PUBLICATIONS

International Search Report and written opinion for application No. PCT/IB2019/058793 dated Nov. 25, 2019, 11 pgs.

*Primary Examiner* — Nguyen Tran
*Assistant Examiner* — Jagdeep S Dhillon
(74) *Attorney, Agent, or Firm* — Hoffman Warnick LLC

(57) ABSTRACT

A system and method of managing a power infrastructure having a plurality of duty power modules (DPMs) configured to power a plurality of load centers. Various different operational modes may be deployed. Inherent redundancy mode is implemented by: monitoring operations of the power infrastructure; powering each load center during normal operations using DPMs through a load center switch via an enabled preferred setting (PS) input; providing an inherent redundancy (IR) bus coupled to each load center switch via an alternate setting (AS) input that is disabled during normal operations, wherein the IR bus is configured to receive excess capacity power exclusively from the DPMs; and in response to a detected DPM failure, disabling the PS input and enabling the AS input in the load center switch for an affected load center to capture power from the IR bus.

20 Claims, 27 Drawing Sheets

(56) References Cited

U.S. PATENT DOCUMENTS

| | | |
|---|---|---|
| 2012/0098338 A1 | 4/2012 | Lew et al. |
| 2013/0080793 A1 | 3/2013 | Familiant et al. |
| 2013/0099574 A1* | 4/2013 | Bourgeois .............. H02J 9/062 307/66 |
| 2015/0378408 A1 | 12/2015 | Kaplan |
| 2016/0195911 A1* | 7/2016 | Chapel .................... H02J 1/14 713/340 |
| 2017/0170683 A1 | 6/2017 | Navarro et al. |
| 2017/0359922 A1 | 12/2017 | Bailey et al. |

* cited by examiner

| AR Permutation Reference | ITLC1 | ITLC2 | ITLC3 | ITLC4 |
|---|---|---|---|---|
| 1 | 2N | N | N | N |
| 2 | N | 2N | N | N |
| 3 | N | N | 2N | N |
| 4 | N | N | N | 2N |
| 5 | N+1 | N | N | N |
| 6 | N | N+1 | N | N |
| 7 | N | N | N+1 | N |
| 8 | N | N | N | N+1 |
| 9 | N+1 | N+1 | N | N |
| 10 | N | N+1 | N+1 | N |
| 11 | N | N | N+1 | N+1 |
| 12 | N+1 | N | N+1 | N |
| 13 | N | N+1 | N | N+1 |
| 14 | N+1 | N+1 | N+1 | N |
| 15 | N | N+1 | N+1 | N+1 |
| 16 | N+1 | N | N+1 | N+1 |
| 17 | N+1 | N+1 | N | N+1 |
| 18 | N+1 | N+1 | N+1 | N+1 |

Norm - All SSW = Off

| UPS REF | U1 | U1 | U1 | U2 | U2 | U3 |
|---|---|---|---|---|---|---|
| UPS LOAD | 0.500 | 0.100 | 0.375 | 0.150 | 0.050 | 0.075 |
| | | | | | | |
| ITLC REF | ITLC1 | ITLC2 | ITLC3 | ITLC4 | ITLC5 | ITLC6 |
| ITLC LOAD | 1.000 | 0.200 | 0.750 | 0.300 | 0.100 | 0.150 |
| | | | | | | |
| UPS LOAD | 0.500 | 0.100 | 0.375 | 0.150 | 0.050 | 0.075 |
| UPS REF | U2 | U3 | U4 | U3 | U4 | U4 |

| UPS | Load (MW) |
|---|---|
| U1 | 0.875 |
| U2 | 0.800 |
| U3 | 0.425 |
| U4 | 0.400 |
| Total | 2.500 |

— 81

U1 Fail no ARP - All SSW = Off

| UPS REF | U1 | U1 | U1 | U2 | U2 | U3 |
|---|---|---|---|---|---|---|
| UPS LOAD | 0.000 | 0.000 | 0.000 | 0.150 | 0.050 | 0.075 |
| | | | | | | |
| ITLC REF | ITLC1 | ITLC2 | ITLC3 | ITLC4 | ITLC5 | ITLC6 |
| ITLC LOAD | 1.000 | 0.200 | 0.750 | 0.300 | 0.100 | 0.150 |
| | | | | | | |
| UPS LOAD | 1.000 | 0.200 | 0.750 | 0.150 | 0.050 | 0.075 |
| UPS REF | U2 | U3 | U4 | U3 | U4 | U4 |

| UPS | Load (MW) |
|---|---|
| U1 | 0.000 |
| U2 | 1.200 |
| U3 | 0.425 |
| U4 | 0.875 |
| Total | 2.500 |

— 83

U1 Fail ARP - SSW1,2 & 3 = Off, SSW4 = On

| UPS REF | U1 | U1 | U1 | U2 | U2 | U3 |
|---|---|---|---|---|---|---|
| UPS LOAD | 0.000 | 0.000 | 0.000 | 0.150 | 0.050 | 0.075 |
| | | | | | | |
| ITLC REF | ITLC1 | ITLC2 | ITLC3 | ITLC4 | ITLC5 | ITLC6 |
| ITLC LOAD | 1.000 | 0.200 | 0.750 | 0.300 | 0.100 | 0.150 |
| | | | | | | |
| UPS LOAD | 1.000 | 0.200 | 0.750 | 0.150 | 0.050 | 0.075 |
| UPS REF | U2 | U3 | U4 | U3 | U4 | U4 |

| UPS | Load (MW) |
|---|---|
| U1 | 0.000 |
| U2 | 1.000 |
| U3 | 0.625 |
| U4 | 0.875 |
| Total | 2.5000 |

Group 100

| SRC | PS | AS | | PS | AS | | PS | AS | | PS | AS | | PS | AS | | PS | AS |
|---|---|---|---|---|---|---|---|---|---|---|---|---|---|---|---|---|---|
| STS REF | \multicolumn{2}{c}{STS1A} | | \multicolumn{2}{c}{STS2A} | | \multicolumn{2}{c}{STS3A} | | \multicolumn{2}{c}{STS4A} | | \multicolumn{2}{c}{STS5A} | | \multicolumn{2}{c}{STS6A} |
| FROM | U1 | UR | | U2 | UR | | U3 | UR | | U4 | UR | | U5 | UR | | U6 | UR |
| SCR LOAD | 0.40 | 0.00 | | 0.20 | 0.00 | | 0.35 | 0.00 | | 0.45 | 0.00 | | 0.40 | 0.00 | | 0.30 | 0.00 |

| ITLC REF | ITLC1 | ITLC2 | ITLC3 | ITLC4 | ITLC5 | ITLC6 |
|---|---|---|---|---|---|---|
| | 0.80 | 0.40 | 0.70 | 0.90 | 0.80 | 0.60 |

| SCR LOAD | 0.40 | 0.00 | | 0.20 | 0.00 | | 0.35 | 0.00 | | 0.45 | 0.00 | | 0.40 | 0.00 | | 0.30 | 0.00 |
|---|---|---|---|---|---|---|---|---|---|---|---|---|---|---|---|---|---|
| FROM | U1 | UR | | U2 | UR | | U3 | UR | | U4 | UR | | U5 | UR | | U6 | UR |
| STS REF | \multicolumn{2}{c}{STS1B} | | \multicolumn{2}{c}{STS2B} | | \multicolumn{2}{c}{STS3B} | | \multicolumn{2}{c}{STS4B} | | \multicolumn{2}{c}{STS5B} | | \multicolumn{2}{c}{STS6B} |
| SRC | PS | AS | | PS | AS | | PS | AS | | PS | AS | | PS | AS | | PS | AS |

| UPS | Load (MW) | IR (MW) |
|---|---|---|
| U1 | 0.80 | 0.20 |
| U2 | 0.40 | 0.60 |
| U3 | 0.70 | 0.30 |
| U4 | 0.90 | 0.10 |
| U5 | 0.80 | 0.20 |
| U6 | 0.60 | 0.40 |
| Total | 4.20 | 1.80 |

Group 102

| SRC | PS | AS | | PS | AS | | PS | AS | | PS | AS | | PS | AS | | PS | AS |
|---|---|---|---|---|---|---|---|---|---|---|---|---|---|---|---|---|---|
| STS REF | \multicolumn{2}{c}{STS1A} | | \multicolumn{2}{c}{STS2A} | | \multicolumn{2}{c}{STS3A} | | \multicolumn{2}{c}{STS4A} | | \multicolumn{2}{c}{STS5A} | | \multicolumn{2}{c}{STS6A} |
| FROM | U1 | IR | | U2 | IR | | U3 | IR | | U4 | IR | | U5 | IR | | U6 | IR |
| SCR LOAD | 0.00 | 0.40 | | 0.20 | 0.00 | | 0.35 | 0.00 | | 0.45 | 0.00 | | 0.40 | 0.00 | | 0.30 | 0.00 |

| ITLC REF | ITLC1 | ITLC2 | ITLC3 | ITLC4 | ITLC5 | ITLC6 |
|---|---|---|---|---|---|---|
| | 0.80 | 0.40 | 0.70 | 0.90 | 0.80 | 0.60 |

| SCR LOAD | 0.00 | 0.40 | | 0.20 | 0.00 | | 0.35 | 0.00 | | 0.45 | 0.00 | | 0.40 | 0.00 | | 0.30 | 0.00 |
|---|---|---|---|---|---|---|---|---|---|---|---|---|---|---|---|---|---|
| FROM | U1 | IR | | U2 | IR | | U3 | IR | | U4 | IR | | U5 | IR | | U6 | IR |
| STS REF | \multicolumn{2}{c}{STS1B} | | \multicolumn{2}{c}{STS2B} | | \multicolumn{2}{c}{STS3B} | | \multicolumn{2}{c}{STS4B} | | \multicolumn{2}{c}{STS5B} | | \multicolumn{2}{c}{STS6B} |
| SRC | PS | AS | | PS | AS | | PS | AS | | PS | AS | | PS | AS | | PS | AS |

| UPS | Load (MW) | IR (MW) |
|---|---|---|
| U1 | 0.00 | 0.00 |
| U2 | 1.00 | 0.00 |
| U3 | 0.70 | 0.30 |
| U4 | 0.90 | 0.10 |
| U5 | 1.00 | 0.00 |
| U6 | 0.60 | 0.40 |
| Total | 4.20 | 0.80 |

| SRC | PS | AS | PS | AS | PS | AS | PS | AS | PS | AS | PS | AS |
|---|---|---|---|---|---|---|---|---|---|---|---|---|
| STS REF | STS1A | | STS2A | | STS3A | | STS4A | | STS5A | | STS6A | |
| FROM | U1 | IR | U2 | IR | U3 | IR | U4 | IR | U5 | IR | U6 | IR |
| SCR LOAD | 0.40 | 0.00 | 0.45 | 0.00 | 0.30 | 0.00 | 0.50 | 0.00 | 0.35 | 0.00 | 0.50 | 0.00 |

| ITLC REF | ITLC1 | ITLC2 | ITLC3 | ITLC4 | ITLC5 | ITLC6 |
|---|---|---|---|---|---|---|
| | 0.80 | 0.90 | 0.60 | 1.00 | 0.70 | 1.00 |

| SCR LOAD | 0.40 | 0.00 | 0.45 | 0.00 | 0.30 | 0.00 | 0.50 | 0.00 | 0.35 | 0.00 | 0.50 | 0.00 |
|---|---|---|---|---|---|---|---|---|---|---|---|---|
| FROM | U1 | IR | U2 | IR | U3 | IR | U4 | IR | U5 | IR | U6 | IR |
| STS REF | STS1B | | STS2B | | STS3B | | STS4B | | STS5B | | STS6B | |
| SRC | PS | AS | PS | AS | PS | AS | PS | AS | PS | AS | PS | AS |

| UPS | Load (MW) | IR (MW) |
|---|---|---|
| U1 | 0.80 | 0.20 |
| U2 | 0.90 | 0.10 |
| U3 | 0.60 | 0.40 |
| U4 | 1.00 | 0.00 |
| U5 | 0.70 | 0.30 |
| U6 | 1.00 | 0.00 |
| Total | 5.00 | 1.00 |

106

| SRC | PS | AS | PS | AS | PS | AS | PS | AS | PS | AS | PS | AS |
|---|---|---|---|---|---|---|---|---|---|---|---|---|
| STS REF | STS1A | | STS2A | | STS3A | | STS4A | | STS5A | | STS6A | |
| FROM | U1 | IR | U2 | IR | U3 | IR | U4 | IR | U5 | IR | U6 | IR |
| SCR LOAD | 0.40 | 0.00 | 0.45 | 0.00 | 0.30 | 0.00 | 0.50 | 0.00 | 0.35 | 0.00 | 0.50 | 0.00 |

| ITLC REF | ITLC1 | ITLC2 | ITLC3 | ITLC4 | ITLC5 | ITLC6 |
|---|---|---|---|---|---|---|
| | 0.80 | 0.90 | 0.60 | 1.00 | 0.70 | 1.00 |

| SCR LOAD | 0.40 | 0.00 | 0.45 | 0.00 | 0.30 | 0.00 | 0.50 | 0.00 | 0.35 | 0.00 | 0.50 | 0.00 |
|---|---|---|---|---|---|---|---|---|---|---|---|---|
| FROM | U1 | IR | U2 | IR | U3 | IR | U4 | IR | U5 | IR | U6 | IR |
| STS REF | STS1B | | STS2B | | STS3B | | STS4B | | STS5B | | STS6B | |
| SRC | PS | AS | PS | AS | PS | AS | PS | AS | PS | AS | PS | AS |

| UPS | Load (MW) | IR (MW) |
|---|---|---|
| U1 | 1.00 | 0.00 |
| U2 | 0.00 | 0.00 |
| U3 | 1.00 | 0.00 |
| U4 | 1.00 | 0.00 |
| U5 | 1.00 | 0.00 |
| U6 | 1.00 | 0.00 |
| Total | 5.00 | 0.00 |

| ITLC | Priority Level |
|------|----------------|
| 1    | 1              |
| 2    | 2              |
| 3    | 3              |
| 4    | 4              |

|  | Standby Generator | Main Switchboard | Sub-Switchboard | UPS | Distribution Transformer | Static Switch | STS | PDU | ARP Control Hardware | UPS Static Bypass | Sub-Switchboard to STS | STS to PDU | PDU to ITLC |
|---|---|---|---|---|---|---|---|---|---|---|---|---|---|
| Steady State V, I and f | M | M | M | M | M | M | M | M | M | M | M | M | M |
| Short Circuit | M | M | M | M | M | C | C | M | M | M | M | M | N |
| Unexpected Closed Circuit | M | M | M | M | M | C | C | M | M | M | M | M | N |
| Unexpected Open Circuit | M | M | M | M | M | C | C | M | M | M | M | M | N |
| Overload | M | M | M | M | M | C | C | M | M | M | M | M | N |
| Ground Fault | M | M | M | M | M | C | C | M | M | M | M | M | N |

Key
N  Not Monitored
M  Monitored or Measured
C  Monitor and Control
n/a Not Applicable

Figure 28

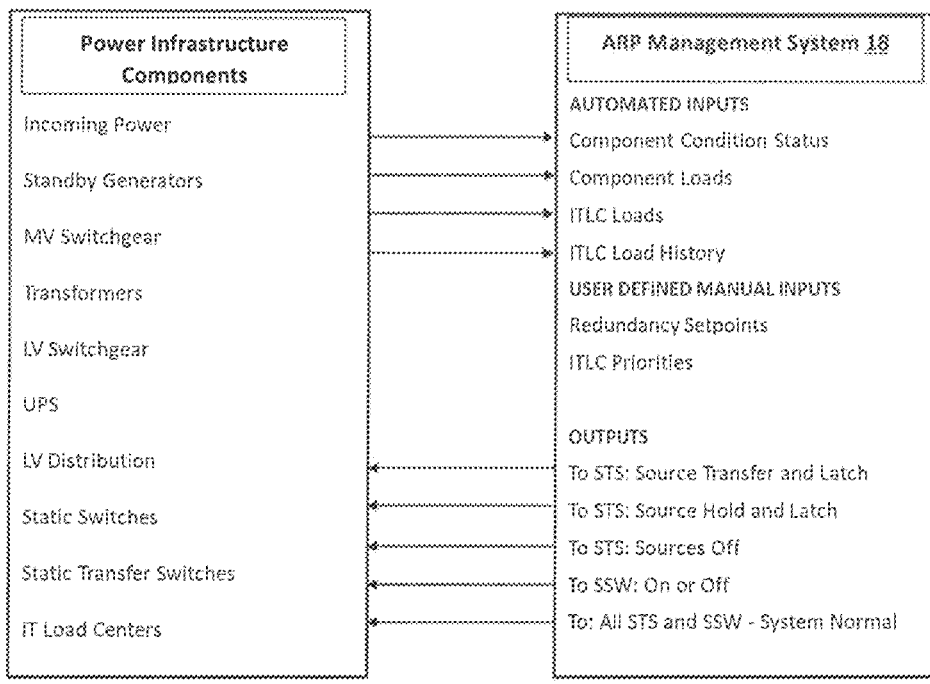

Figure 29

ADAPTABLE REDUNDANT POWER

TECHNICAL FIELD

The present invention relates to supplying power to mission critical facilities such as data centers, and more particularly to a system and method of utilizing adaptable redundant power to provide power system redundancy and capacity optimization.

BACKGROUND OF THE DISCLOSURE

Managing the power requirements of facilities such as data centers remains an ongoing challenge. In the US alone, billions of kilowatt-hours of electricity are consumed by data centers each year with annual costs in the billions of dollars. Such operational costs are passed to the tenants, and ultimately end users. Various factors that drive up costs include the need to provide excess capacity and high levels of redundancy. For example, in order to ensure a high level of service, a typical tenant may only use 40-60% of a maximum power requirement they contracted for, resulting in a large amount unused or excess capacity.

In addition, data centers must provide redundancy in the event of a power failure. Unfortunately, contemporary power systems are relatively inflexible in that redundant components and designs are generally fixed, and cannot be altered to provide different levels of redundancy service. Accordingly, a typical data center is designed to provide one level of redundancy to all tenants, regardless of their needs.

BRIEF SUMMARY OF THE DISCLOSURE

Aspects of this disclosure provide an adaptable redundant power (ARP) management system for use in data centers and the like. ARP provides a power system redundancy configuration that can be dynamically implemented, thus allowing multiple redundancy levels to be simultaneously offered within the same power system. In addition, ARP enables conversion of disjunctive unused inherent power capacity into accessible power capacity that can be used to dynamically provide additional redundant power. Further ARP can be used to redistribute unused capacity for additional sub-system power capacity.

Accordingly, ARP enables the controlled diversion of power capacity to support predetermined redundancy configurations and simultaneously provide multiple redundancy configurations within the same power system. ARP also enables failure management when multiple power system components are simultaneously unavailable to maintain continuous power to a prioritized hierarchy of loads.

Aspects disclose the use of switching devices, such as STS, static switches, solid-state circuit breakers, solid-state switches, electromechanical circuit breakers and/or electro-mechanical switches, capable of changing the state of power system redundancy configuration or alter the distribution of power to different loads with no power interruption.

A first aspect of the disclosure provides an adaptable redundant power (ARP) platform, comprising: a power infrastructure having: a plurality of duty power module (DPMs) configured to power a plurality of load centers, wherein each of the DPMs provides power to at least one load center during normal operations via a load center switch using an enabled preferred setting (PS) input, and an inherent redundancy (IR) bus coupled to each load center switch via an alternate setting (AS) input that is disabled during normal operations, wherein the IR bus is configured to receive excess capacity power exclusively from the DPMs; and an inherent redundancy (IR) mode manager that monitors the power infrastructure, and in response to a detected failure (e.g., DPM, cable, component, equipment, etc.) disables the PS input and enables the AS input in the load center switch for an affected load center to capture power from the IR bus.

A second aspect of the disclosure provides a method of managing a power infrastructure having a plurality of duty power module (DPMs) configured to power a plurality of load centers, comprising: monitoring operations of the power infrastructure; powering each load center during normal operations using DPMs through a load center switch via an enabled preferred setting (PS) input; providing an inherent redundancy (IR) bus coupled to each load center switch via an alternate setting (AS) input that is disabled during normal operations, wherein the IR bus is configured to receive excess capacity power exclusively from the DPMs; and in response to a detected failure (e.g., DPM, cable, component, equipment, etc.) disabling the PS input and enabling the AS input in the load center switch for an affected load center to capture power from the IR bus, wherein each load center switch comprises at least one of a static transfer switch (STS), a static switch, a solid-state circuit breaker, a solid-state switch, an electromechanical circuit breaker and an electro-mechanical switch.

A third aspect of the disclosure provides a computer program product stored on a computer readable medium, which when executed by a computing system provisions an ARP management system for managing a power infrastructure having a plurality of duty power module (DPMs) configured to power a plurality of load centers, the program product comprising: program code for monitoring operations of the power infrastructure; program code for enabling a preferred setting (PS) input for a load center switch to power each load center during normal operations using duty DPMs; program code for disabling, during normal operations, an inherent redundancy (IR) bus which is coupled to each load center switch via an alternate setting (AS) input, wherein the IR bus is configured to receive excess capacity power exclusively from the DPMs; and program code, that in response to a detected failure (e.g., DPM, cable, component, equipment, etc.) disables the PS input and enables the AS input in the load center switch for an affected load center to capture power from the IR bus.

A fourth aspect of the disclosure provides an adaptable redundant power (ARP) platform, comprising: a power infrastructure having: a plurality of duty power module (DPMs) configured to power a plurality of load centers, wherein each of the DPMs provides power to at least one load center during normal operations via a load center switch using an enabled preferred setting (PS) input, and at least one reserve DPM for powering a reserve bus that is coupled to each load center switch via an alternate setting (AS) input that is disabled during normal operations; and an adaptable redundancy (AR) mode manager that: predefines redundancy levels for each load center based on a set of inputted configuration parameters, monitors the power infrastructure, and in response to a detected failure (e.g., DPM, cable, component, equipment, etc.) transfers at least one load center switch from the PS input to the AS input according to the inputted configuration parameters to achieve the predefined redundancy levels.

A fifth aspect of the disclosure provides a method of managing a power infrastructure having a plurality of duty power module (DPMs) configured to power a plurality of load centers, comprising: inputting a set of configuration parameters that predefines redundancy levels for each load center; monitoring operations of the power infrastructure; powering each load center during normal operations using DPMs through a load center switch via an enabled preferred setting (PS) input; and in response to a detected duty failure (e.g., DPM, cable, component, equipment, etc.) transferring at least one load center switch from the PS input to an alternate setting (AS) input according to the inputted configuration parameters to achieve the predefined redundancy levels, wherein the AS input causes power to be obtained from a reserve bus powered by a reserve DPM.

A sixth aspect of the disclosure provides a computer program product stored on a computer readable medium, which when executed by a computing system provides an ARP management system for managing a power infrastructure having a plurality of duty power module (DPMs) configured to power a plurality of load centers, the program product comprising: program code for inputting a set of configuration parameters that predefines redundancy levels for each load center; program code for monitoring operations of the power infrastructure; program code for powering each load center during normal operations using DPMs through a load center switch via an enabled preferred setting (PS) input; and program code for, in response to a detected duty failure (e.g., DPM, cable, component, equipment, etc.) transferring at least one load center switch from the PS input to an alternate setting (AS) input according to the inputted configuration parameters to achieve the predefined redundancy levels, wherein the AS input causes power to be obtained from a reserve bus powered by a reserve DPM.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 depicts a table of permutations for applying AR to the infrastructure of FIG. 2, in accordance with an illustrative embodiment.

FIG. 6 depicts load values for the power infrastructure of FIG. 5, in accordance with an illustrative embodiment.

FIG. 11 depicts load values for the power infrastructure of FIGS. 8-10, in accordance with an illustrative embodiment.

FIG. 13 depicts load values for the power infrastructure of FIG. 12, in accordance with an illustrative embodiment.

FIG. 17 depicts load values for the power infrastructure of FIG. 16, in accordance with an illustrative embodiment.

FIG. 19 depicts load values for the power infrastructure of FIG. 18, in accordance with an illustrative embodiment.

FIG. 22 depicts load values for the power infrastructure of FIG. 21, in accordance with an illustrative embodiment.

FIG. 28 depicts a table of components and monitored features, in accordance with an illustrative embodiment.

FIG. 29 depicts a block diagram of the monitoring and control process, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for providing adaptable redundant power management for power consuming facilities. Note that while the embodiments described herein are directed to data center facilities, it is understood that the concepts could be applied to any type of mission critical facility in which redundant power is required for multiple load centers.

Figure 1:
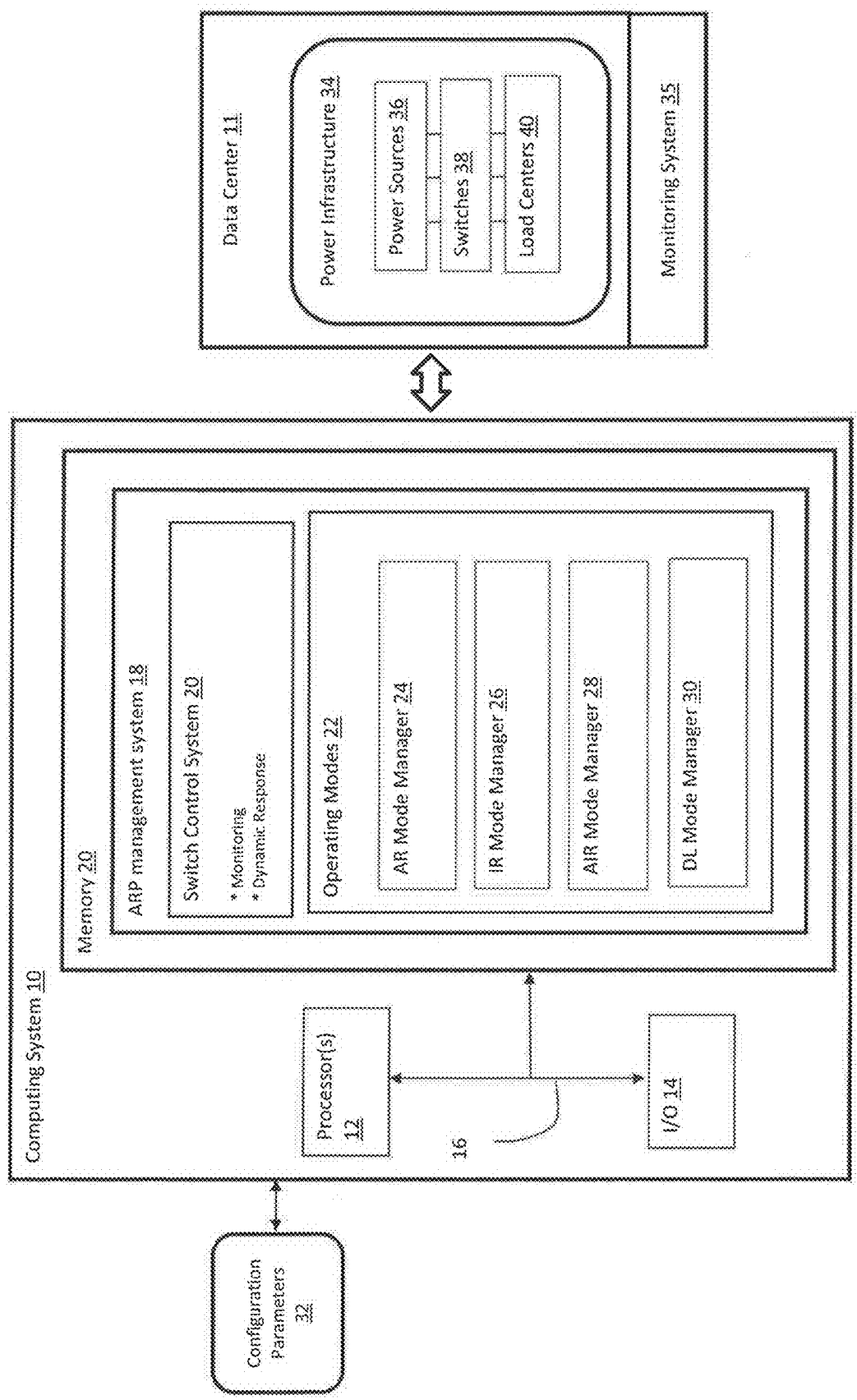
FIG. 1 depicts a computing system having an ARP management system, in accordance with an illustrative embodiment.

Referring to FIG. 1, an illustrative adaptable redundant power (ARP) platform is shown having a computing system 10 that provisions an ARP management system 18 for managing a power infrastructure 34 for a data center 11. Power infrastructure 34 generally comprises a set of power sources 36, generally referred to as Duty Power Modules or DPM's, information technology load centers (ITLCs) 40 that contract for a defined amount of power from the data center 11, and a set of switches 38 that control the flow of power from the power sources 36 to the load centers 40. DPM's may for example comprise a static or dynamic universal power supply (UPS), switchgear that takes power directly from a utility or standby generator, or any other power source equipment.

ARP management system 18 provides a platform through which different power infrastructure configurations or "modes" that provide dynamic control over the power infrastructure 34 to increase flexibility, reduce capital cost and reduce operational costs. In this example, a switch control system 20 monitors the operations of the power infrastructure 24 via a monitoring system 35, and when a failure occurs, dynamically controls the operation of the switches 38, e.g., based on prescribed redundancy levels, load analysis, load prioritization, etc. Thus, if a particular DPM, i.e., power source, cable, component, equipment, etc., fails, the switch control system 20 can dynamically configure the switches 38 to redistribute power according to a preconfigured scheme. The ability to dynamically redistribute power in this manner allows ARP management system 18 to either better leverage existing power system topologies or allow for newer topologies that require fewer backup resources.

As shown in FIG. 1, ARP management system 18 is configured to manage the power infrastructure 24 in different operating modes 22. As shown, illustrative operating modes 22 can for example include one or more of: an adaptable redundancy (AR) mode manager 24, an inherent redundancy (IR) mode manager 26, an adaptable and inherent redundancy (AIR) mode manager 28 and a damage limitation (DL) mode manager 30.

As an example, AR mode manager 24 provisions and manages predetermined redundancy levels to different load centers (ITLCs), typically using known topologies, in which redundancy is derived entirely from discreet, dedicated components. In AR mode, different ITLCs can for example be supported with either a single level or multiple levels of redundancy. When a failure occurs, AR mode manager 24 dynamically reconfigures switches 38 (e.g., using set-points provided by the configuration parameters 32) to allocate power in a prescribed manner such that different ITLCs are afforded different levels of service. In one embodiment, ARP management system 18 utilizes a set of inputted configuration parameters 32 for dictating a backup behavior for an implemented power infrastructure 34. The parameters 32 dictate how the power infrastructure 34 should respond in the event of a failure to provision prescribed redundancy levels.

ARP management system 18 is adapted to control various types of load power supply configurations and switches, including multi-power source input ITLCs with external STS switching, multi-power source input ITLCs within integral source input switching, multi-power source input ITLCs with external source input switching, etc. switching devices, such as STS, Any type of static switches, solid-state circuit breakers, solid-state switches, electromechanical circuit breakers and electro-mechanical switches, etc., capable of changing the state of the power system redundancy configuration or alter the distribution of power to ITLCs with no power interruption to the ITLCs when instructed by the ARP management system 18 may be deployed.

Figure 2:
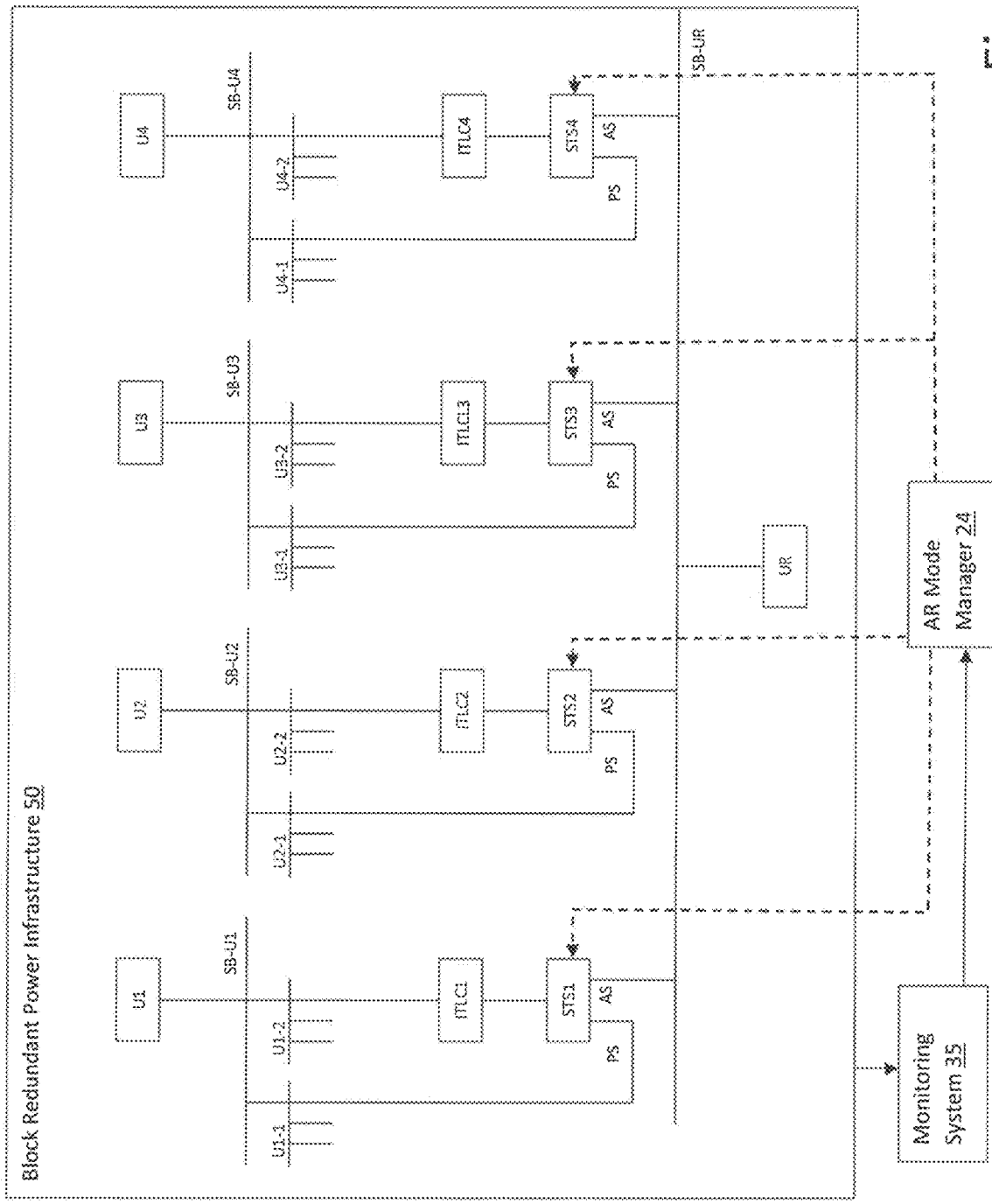
FIG. 2 depicts a block redundant power infrastructure using AR, in accordance with an illustrative embodiment.

FIG. 2 depicts a block redundant power infrastructure 50 that employs AR mode manger 24 to control a 1-of-4 configuration, in which different ITLCs are preconfigured with different levels of redundancy. In this case, U1 to U4 are DPMs, each with the same capacity, UR is a reserve duty power module (RDPM) with the same capacity as the DPMs, and ITLCs 1-4 have a design capacity equal to the DPM capacity. Each STS 1-4 comprises a static transfer switch having two inputs, PS and AS. Each STS PS input is connected to the DPM input via its associated system bus (SB-Un) and each STS AS input is connected to the RDPM (UR) input via system bus SB-UR.

In a conventional mode, UR would provide N+1 DPM redundancy to each ITLC in this infrastructure 50, such that the system would operate with distributed IT loads and the ITLCs would run at maximum load. In the event a DPM output was unavailable, the STS connected to the unavailable DPM output will transfer to its alternate source (AS), and UR would provide power to the ITLC connected to the affected DPM output. In the event of multiple simultaneous DPM output failures, each STS connected to the failed DPM outputs would transfer to their alternate source (AS). In such cases, UR would support the affected ITLCs provided the combined sum of the affected IT loads was within the capacity of UR. Otherwise, UR would overload and all ITLCs connected to the failed DPM outputs would lose power.

By employing ARP management system 18 and AR mode manager 24 as shown, different ITLCs can be preconfigured with different redundancy service levels, thus providing a more flexible block redundant power infrastructure 50. In this case, AR mode manager 24 is configured to selectively enable and disable AS inputs in each STS to provide different levels of redundancy when a failure is detected by monitoring system 35. As shown, AR mode manager 24 is linked to each switch (STS1-4) using control signals show as dashed lines. The table shown in FIG. 3 details each of the possible AR permutations that AR mode manager can implemented for this configuration (e.g., based on inputted configuration parameters).

Accordingly, if the data center needed to provision AR Permutation Reference 1 in which ITLC1 is assigned a 2N DPM redundancy, and ITLC2, ITLC3 and ITLC4 are each assigned N DPM redundancy, and AR mode manager 24 would dynamically set the STS switches as follows when a failure occurs:

STS1: PS set to U1, AS transfer enabled
STS2: PS set to U2, AS transfer is disabled
STS3: PS set to U3, AS transfer is disabled
STS4: PS set to U4, AS transfer is disabled To achieve AR Permutation Reference 9 in which ITLC1 and ITLC2 are assigned N+1 DPM redundancy, and ITLC3 and ITLC4 are assigned N DPM redundancy, AR mode 24 would set the STS switches as follows when a failure occurs:

STS1: PS set to U1, AS transfer enabled
STS2: PS set to U2, AS transfer enabled
STS3: PS set to U3, AS transfer disabled
STS4: PS set to U4, AS transfer disabled Inherent redundancy (IR) mode manager 26 (FIG. 1) provisions and manages predetermined redundant levels to the ITLCs in which redundancy is derived entirely from unused power capacity, e.g., provided by existing DPMs. IR mode can thus operate within a new (or atypical) power infrastructure topology in which conventional discreet redundant components can be eliminated or augmented. IR mode can also be leveraged to allow unused power capacity to be accessed and shared during normal operating conditions.

Figure 4:
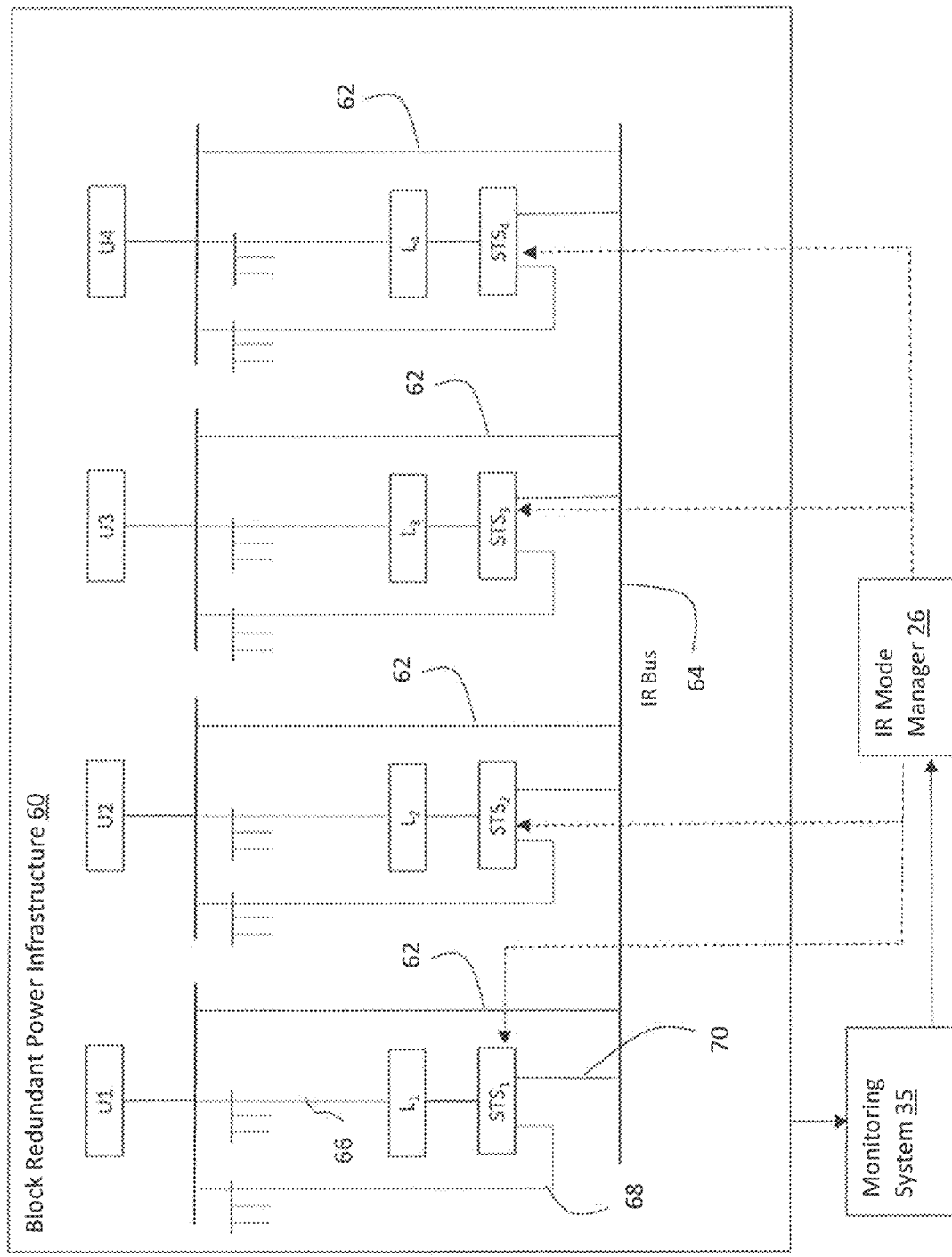
FIG. 4 depicts a block redundant power infrastructure managed by an IR manager, in accordance with an illustrative embodiment.

FIG. 4 depicts a simple example of an IR power infrastructure 60 having four loads ($L_1$, $L_2$, $L_3$, $L_4$), four duty power module sources (U1, U2, U3, U4), and no reserve duty power module source. During normal operations, each duty power module (e.g., U1) is connected to a respective load (e.g., $L_1$) from a first feed 66 directly from the power source and from a second feed 68 via a switch (e.g., $STS_1$). As noted, infrastructure 60 does not include a reserve duty power module (e.g., UR in FIG. 2). Instead, a shared IR bus 64 is provided, which receives excess power or unused capacity from each of the four duty power modules (U1, U2, U3, U4) via feeds 62. If one of the duty power modules fail (e.g., U1), then the associate switch (e.g., $STS_1$) disables the second feed 68 and enables IR feed 70 to power the load. Using this approach, excess power from the remaining duty power modules (e.g., U2, U3, U4) provides the necessary redundancy thus eliminating redundant components typically employed in a power infrastructure. IR configuration set-points provided in the inputted configuration parameters 32 (FIG. 1) determines how the IR mode manager 26 responds to a failure condition. Thus, infrastructure 60 can dynamically respond in a preconfigured manner to implement ITLC redundancy to suit end-user requirements.

Unused Capacity (UC) within the power infrastructure 60 is the difference between the Contracted Power ($C_{pwr}$) and Maximum User Power ($M_{pwr}$) as given by the equation:

$$UC = \sum_1^n Cpwr - \sum_1^n Mpwr$$

Utilization (U) is given by the equation:

$$U = \frac{\sum_1^n Mpwr}{\sum_1^n Cpwr}$$

Where
U=overall power system utilization
$M_{pwr}$=maximum power used by each ITLC
$C_{pwr}$=contracted power capacity of each ITLC
n=ITLC reference number When IR mode is applied to the maximum utilization ($U_{max}$) for a power infrastructure with N duty modules with λ redundancy when there is no power contribution from discreet redundant components is given by the equation:

$$U\max = \frac{N - \lambda}{N}$$

Where
Umax=maximum utilization
N=number of DPMs to provide the Total Contracted Power (Cmax)
λ=required number of redundant components
The Maximum Actual Power simultaneously drawn by all ITLCs ($M_{act}$) is given by the equation:

$$M_{act} = U_{max} \cdot C_{max}$$

The following table shows $U_{max}$ for N DPM when λ=1

| N | Umax |
|---|------|
| 1 | 0.0% |
| 2 | 50.0% |
| 3 | 66.7% |
| 4 | 75.0% |
| 5 | 80.0% |
| 6 | 83.3% |
| 7 | 85.7% |
| 8 | 87.5% |
| 9 | 88.9% |
| 10 | 90.0% |

Figure 5:
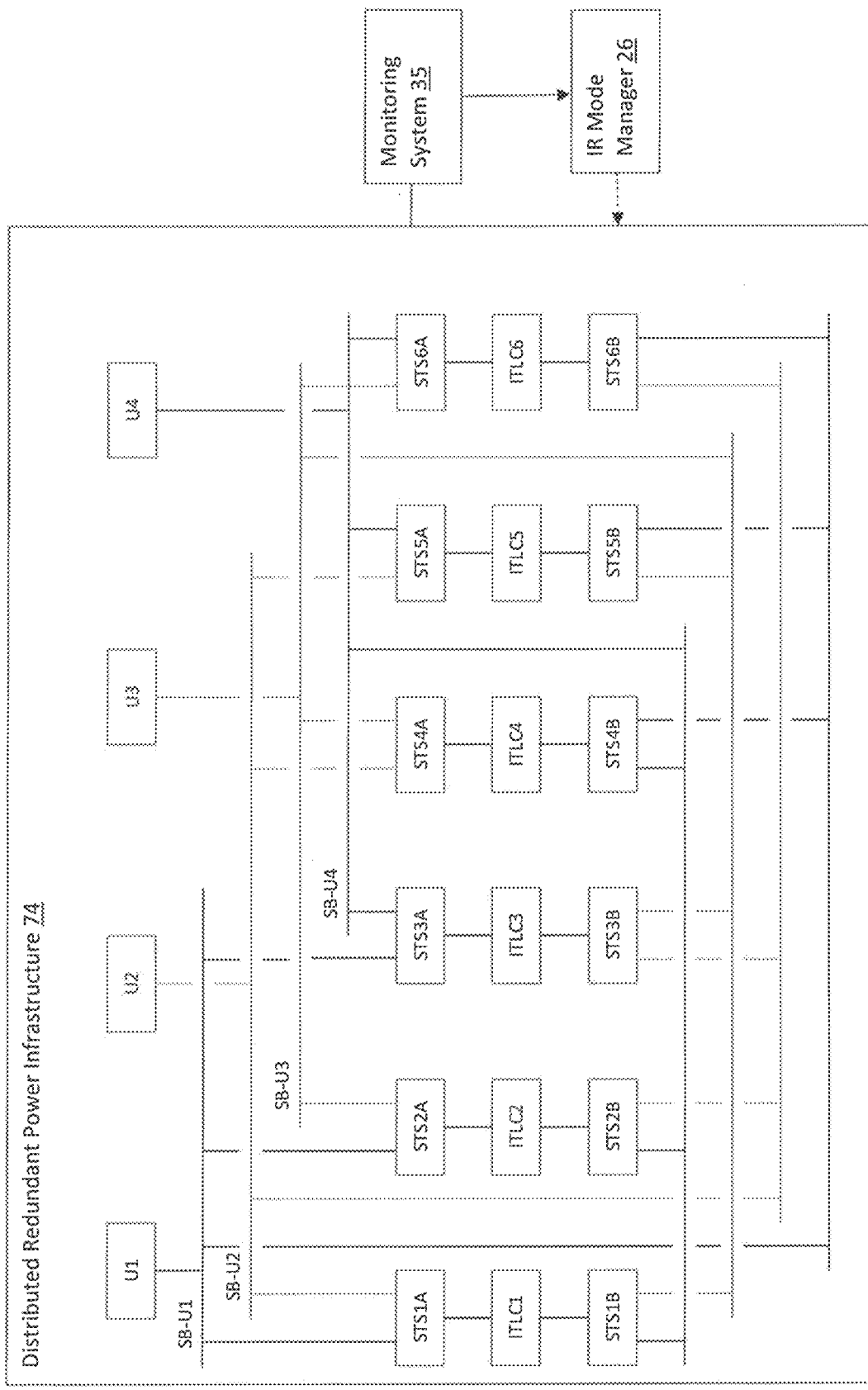
FIG. 5 depicts a distributed redundant power infrastructure managed by an IR manager, in accordance with an illustrative embodiment.
Figure 6:
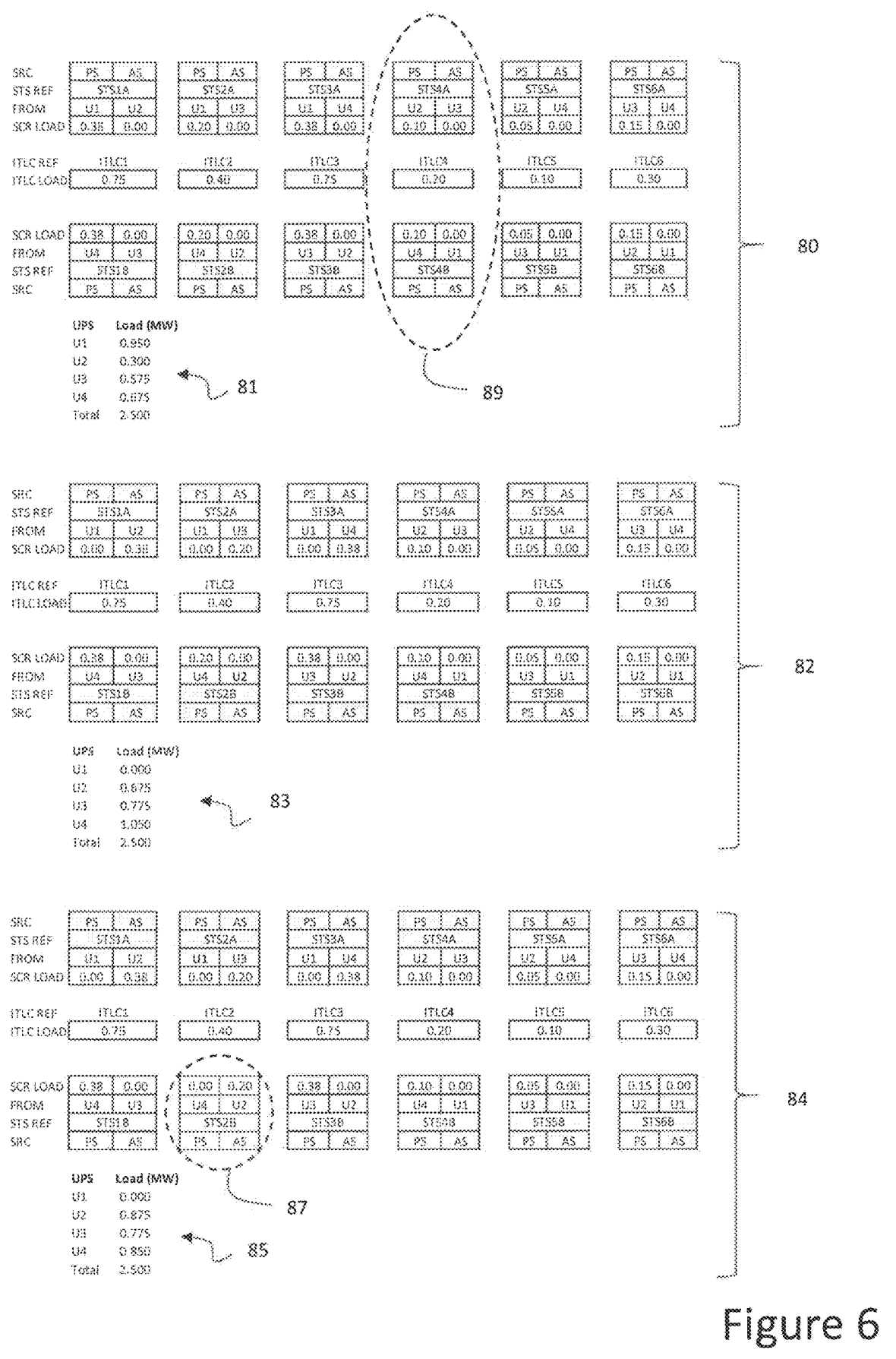

FIG. 5 shows a further implementation of an IR Power Infrastructure 74. In this example, IR is applied to a distributed redundant system having a high-level conventional 4-to-3 Distributed Redundant system (with no reserve DPM). The example assumes the following:
U1 to U4 are DPMs, each rated at 1 MW
DPM redundancy is N+1
$C_{max}$=3 MW
$L_{max}$=0.75 MW FIG. 6 depicts three scenarios 80, 82, 84 in which arbitrary loads ($L_{act}$) assigned to ITLCs 1-6 each have a total load distribution of 2.5 MW system. Scenario 80 depicts normal operations (no failure) using a distributed redundancy approach. As shown, each load, such as ITLC4 89, is capable of receiving power from four different DPMs (U1/U3 on the top and U4/U1 on the bottom). In this case, the total loads 81 from each DPM are all below the 1 MW rating.

Scenario 82 in FIG. 6 again shows the effect of distributed redundancy with no IR mode applied, in which loads 83 on each DPM result when U1 is unavailable. In this case, failure of U1 results in the load capacity of U4 to be exceeded (i.e., U4 is 1.050). Such an overload of U4 may cause the power source to be disconnected resulting in a total power system failure. Accordingly, a disadvantage of this distributed redundant topology with IR mode manager is that loads must be manually managed to ensure the system does not overload one of the available loads when one or more DPM outputs are unavailable.

IR mode enables the system to overcome the disadvantage of manual load management associated with distributed redundant systems. Scenario 84 again shows a failure of U1, but in this case, unused capacity from U2 is accessed by instructing STS2B 87 in real-time to switch from preferred setting (PS) U4 to its alternate source (AS) U2 to prevent U4 from overloading (i.e., U4 is at 0.850 MW). In this case, monitoring system 35 monitors each of the DPM loads (U1-U4), as well as the loads provided through each switch (e.g., STS2B) and each load center (e.g., ITLC2). When a failure occurs, IR mode manager 26 dynamically implements a strategy to redistribute loads to avoid overload conditions.

Figure 7:
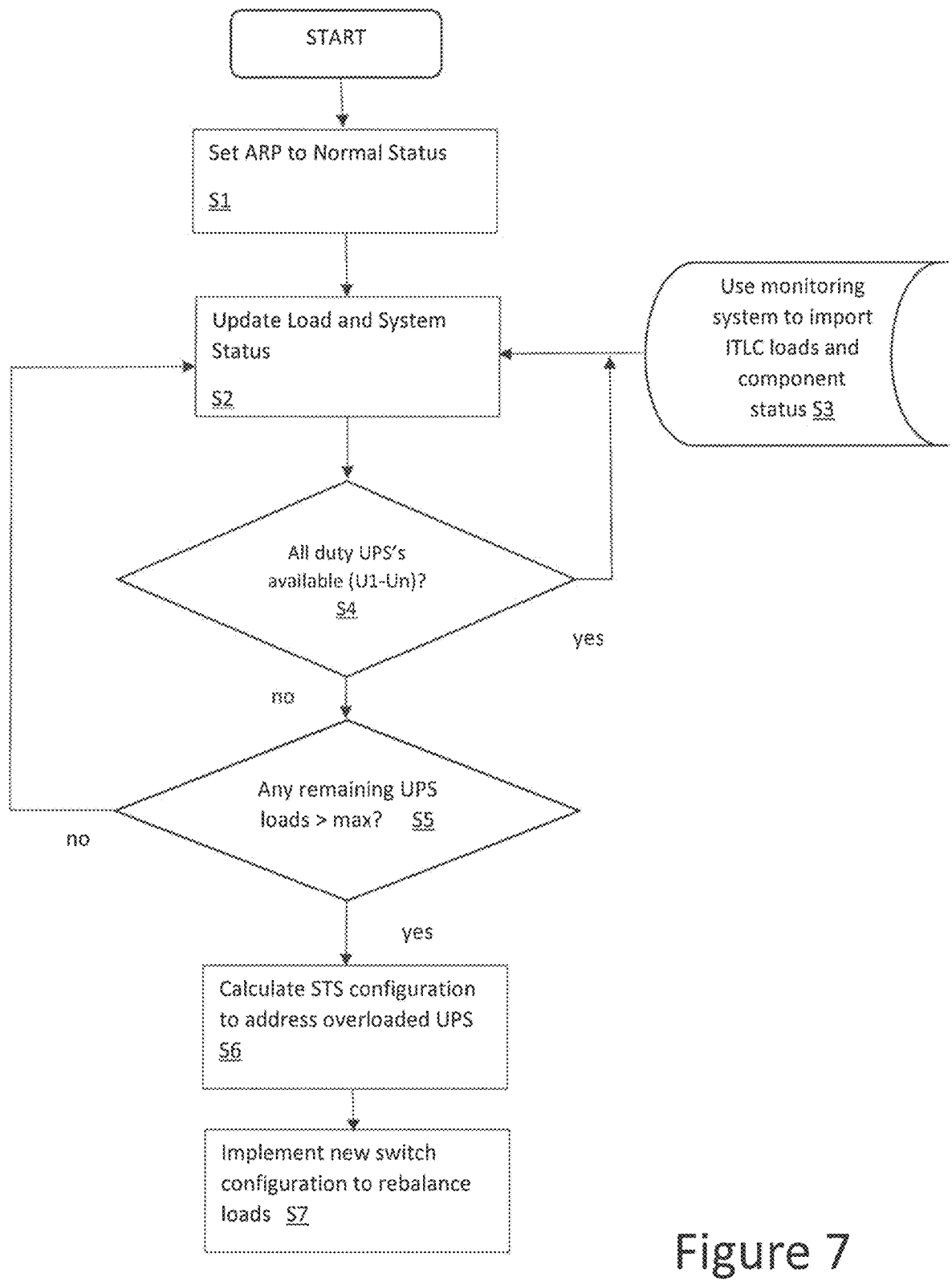
FIG. 7 depicts a flow chart for implementing IR in accordance with an illustrative embodiment.

FIG. 7 depicts a flow diagram showing a process for applying IR to an N+1 distributed redundant system when a single DPM becomes unavailable. At S1, ARP management system 18 is set to normal status, and at S2 load and system status is updated using monitoring system 35 that imports loads and statuses at S3. At S4, a determination is made whether all of the DPMs are available (i.e., no failure). If all are available, the process of updating the load/system statuses repeats. If not all DPMs are available (i.e., a failure is detected at S4), then a determination is made whether any of the remaining operational DPMs are exceeding their maximum load at S5. If no, the process of updating the load/system statuses repeats at S2. If yes at S5, then IR mode manager 26 calculates a switch configuration to address the overloaded DPM at S6. At S7, the switch configuration is implemented to rebalance the loads until the off-line DPM is fixed.

Figure 8:
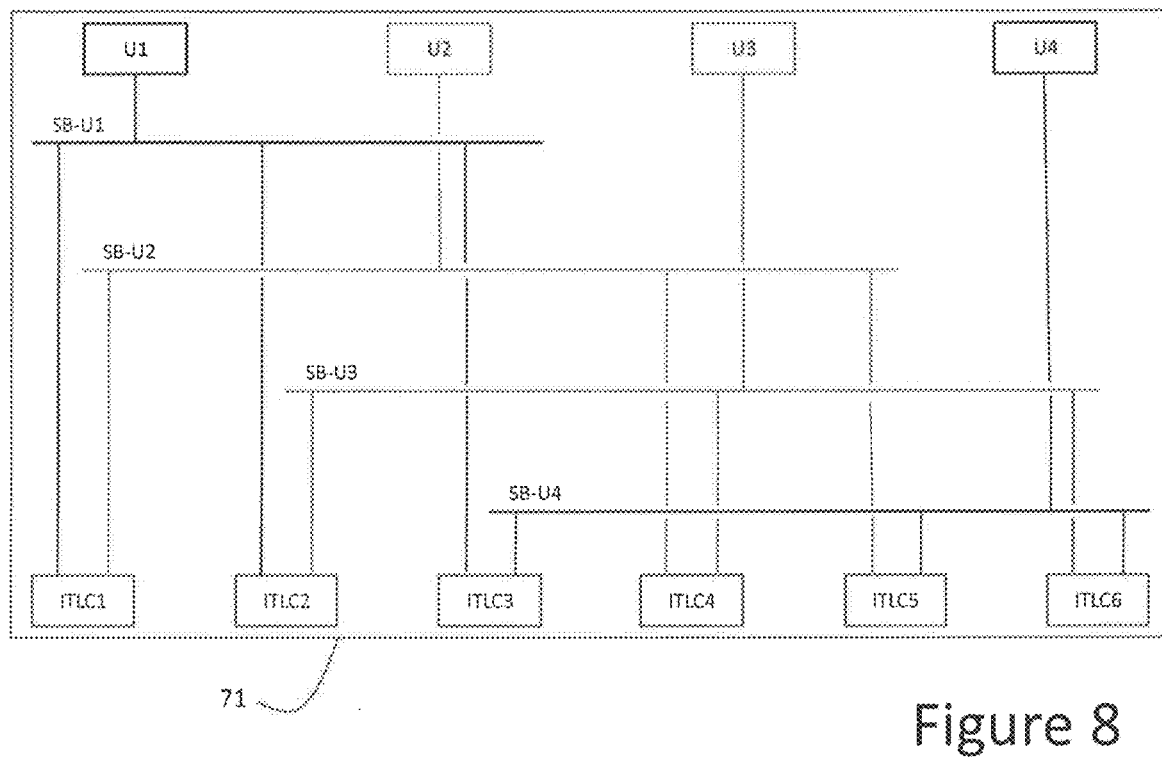
FIG. 8 depicts a conventional setup of a 4-to-3 N+1 distributed redundant infrastructure.
Figure 9:
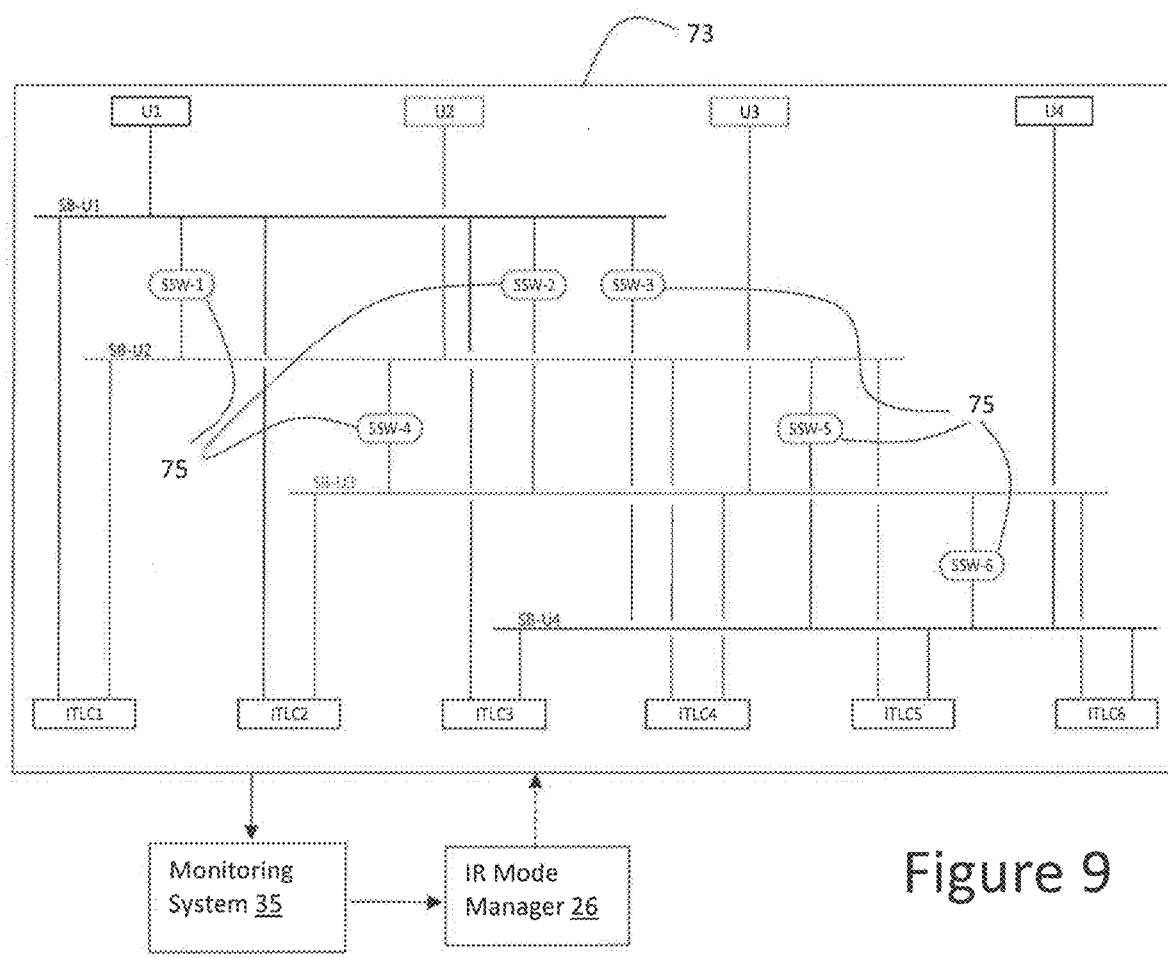
FIG. 9 shows an enhanced infrastructure of FIG. 8 that utilizes static switches, in accordance with an illustrative embodiment.

FIGS. 8-11 depict an illustrative embodiment of applying IR to a 4-to-3 distributed redundant infrastructure. FIG. 8 depicts a conventional setup of a 4-to-3 N+1 distributed redundant infrastructure 72 having four DPMs (U1-U4) and six load centers (ITLC1-ITLC6), in which each DPM provides power to three load centers (e.g., U1 powers ITLC1-ITLC3), U2 powers ITLC1, ITLC4, ITLC5, etc.). Further, each load center receives power from two unique DPMs (e.g., ILTC5 receives power from U2 and U5). For the purposes of this example, assume:

U1 to U4 are DPMs, each rated at 1 MW
DPM redundancy is N+1
Cmax=3 MW
Lmax=0.75 MW FIG. 9 shows an enhanced infrastructure 73 of FIG. 8 in which six static switches 75 (SSW-n) are introduced between each of the four buses (SB-Un) to allow for the flow of inherent power. Accordingly, a switch 75 is provided to connect bus U1 to U2, U1 to U3, U1 to U4, U2 to U3, U2 to U4, and U3 to U4. FIG. 11 shows an arbitrary load distribution table 81 for infrastructure 73 that provides a total load of 2.5 MW during normal operations 81. For instance, as shown, ITLC1 requires 1.000 MW of which 0.500 is provided by U1 and 0.500 is provided by U2. As also shown, U1 supplies 0.500 MW to ITCL1, 0.100 MW to ITLC2, and 0.375 MW to ITLC3, totaling 0.975 MW.

Figure 10:
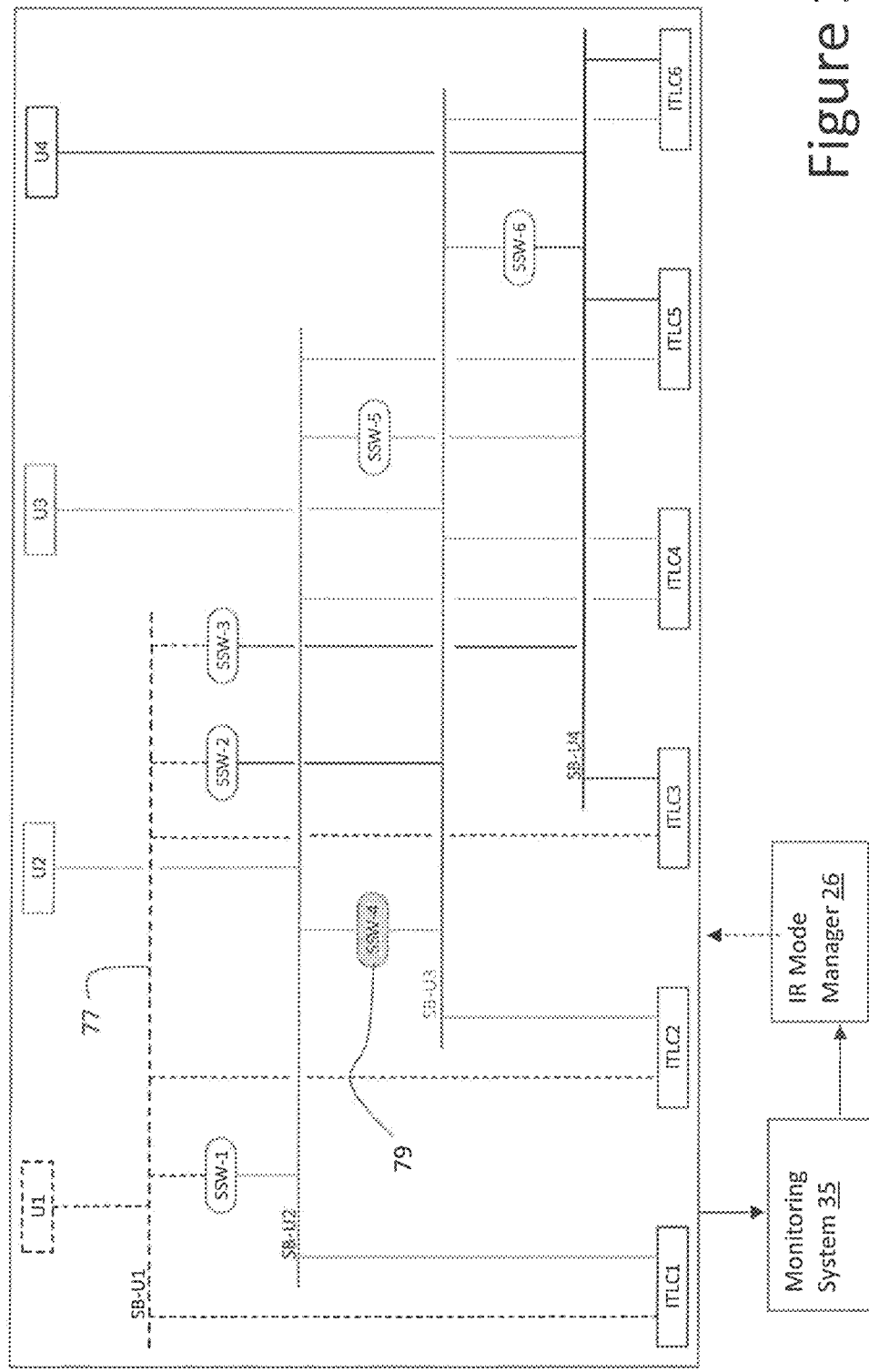
FIG. 10 show an illustrative application involving the enhanced infrastructure of FIG. 9, in accordance with an illustrative embodiment.

FIG. 10 shows the enhanced infrastructure 73 when U1 becomes unavailable. In this case, dashed lines 77 coming from U1 are impacted, thus eliminating U1's power feeds to ITLC1, ITLC2 and ITLC3. The resulting load distribution table 83 is shown in FIG. 11. In this example the capacity of U2 is exceeded (i.e., a load of 1.200 MW is required but U2's capacity is only 1.000 MW). The overload of U2 may cause U2 to be disconnected resulting in a total power system failure.

In this case, in order to address the above issue, switch 79 (SSW-4) is activated connecting bus SB-U2 with SB-U3, thus allowing the inherent power to be transferred to SB-U2 via SSW-4 from SB-U3. The resulting load distribution table 85 is shown in FIG. 11. The unused capacity from U3 is accessed by SB-U2, reducing U2's load down to 1.000 MW and increasing U3's load to 0.625.

Figure 12:
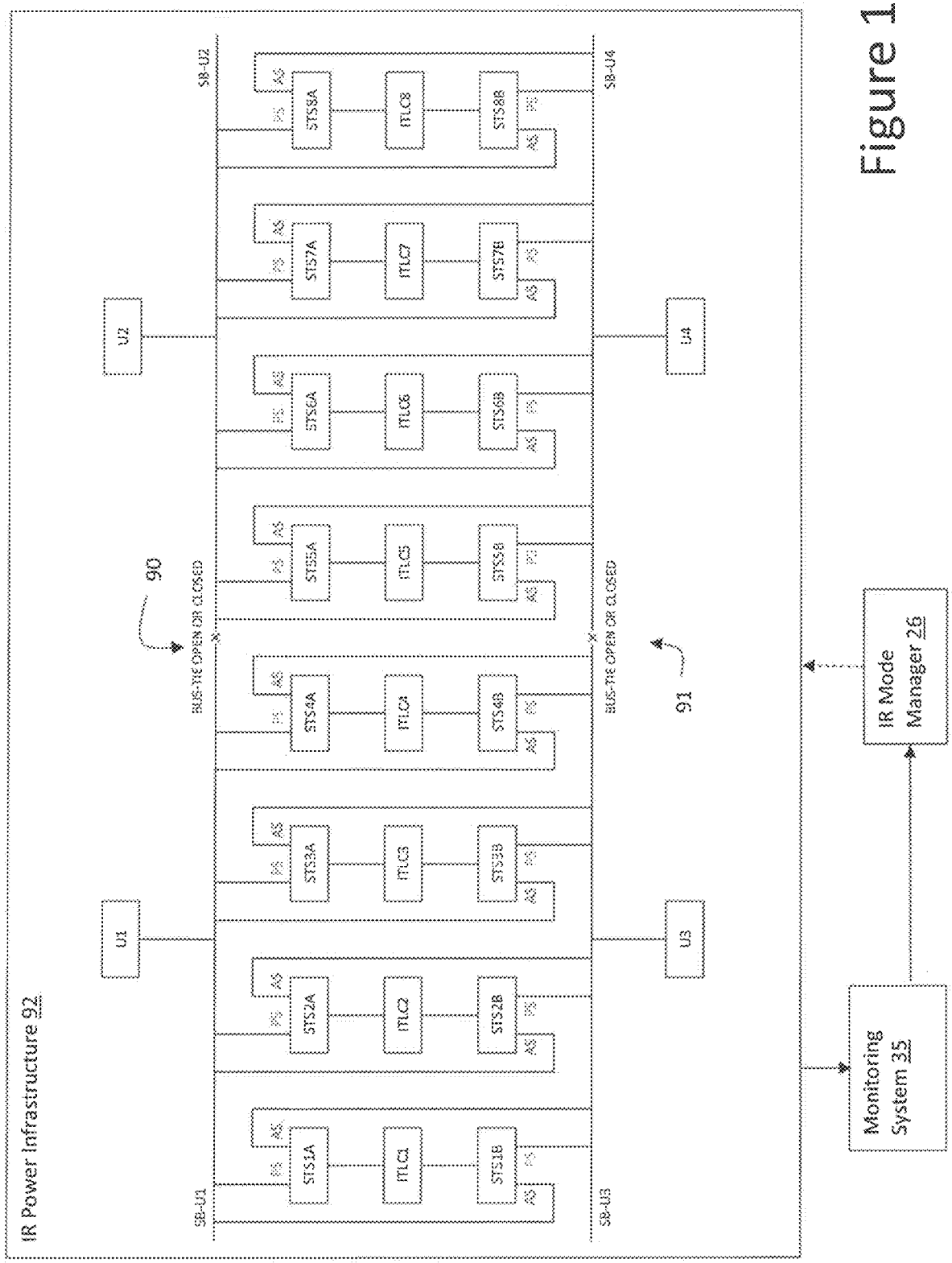
FIG. 12 depicts a further power infrastructure managed by an IR mode manager, in accordance with an illustrative embodiment.

FIG. 12 depicts a further IR power infrastructure 92 that utilizes IR to convert a 2N system to an N+1 system using STS switches. The primary benefits of the conversion are a 50% increase in maximum actual load ($M_{act}$) and 100% increase in ILTC load ($M_{pwr}$) provided $U_{max}$ does not exceed 75% of the total contracted power ($C_{max}$). $U_{max}$ for N+λ DPM component redundancy configuration using IR only, i.e., with no redundant power contribution from discreet redundant components is given by equation:

$$U\max = \frac{N - \lambda}{N}$$

Table A provides a comparison between the 2N and the converted IR N+1 systems. The IR N+1 system is physically identical to the 2N system shown in FIG. 12 except for the SBn bus-ties 90, 91, which can be normally open or closed for a 2N system. The SBn bus-ties 90, 91 are normally closed in this IR example.

TABLE A

| Configuration | System Type | |
| --- | --- | --- |
| | 2N | IR N + 1 |
| Maximum Actual Load ($M_{act}$) | 4 MW | 6 MW |
| Quantity of DPM | 4 | 4 |
| Individual DPM Capacity | 2 MW | 2 MW |
| Quantity of ITLCs | 8 | 8 |
| Maximum ITLC Load ($M_{pwr}$) | ≤0.5 MW | ≤1 MW |
| Total Contracted Power ($C_{max}$) | 4 MW | 8 MW |
| $U_{max}$ | ≤50% | ≤75% |
| Component Fault Tolerance | Dual | Single |
| Distribution Fault Tolerant | Yes | Yes |

Figure 13:
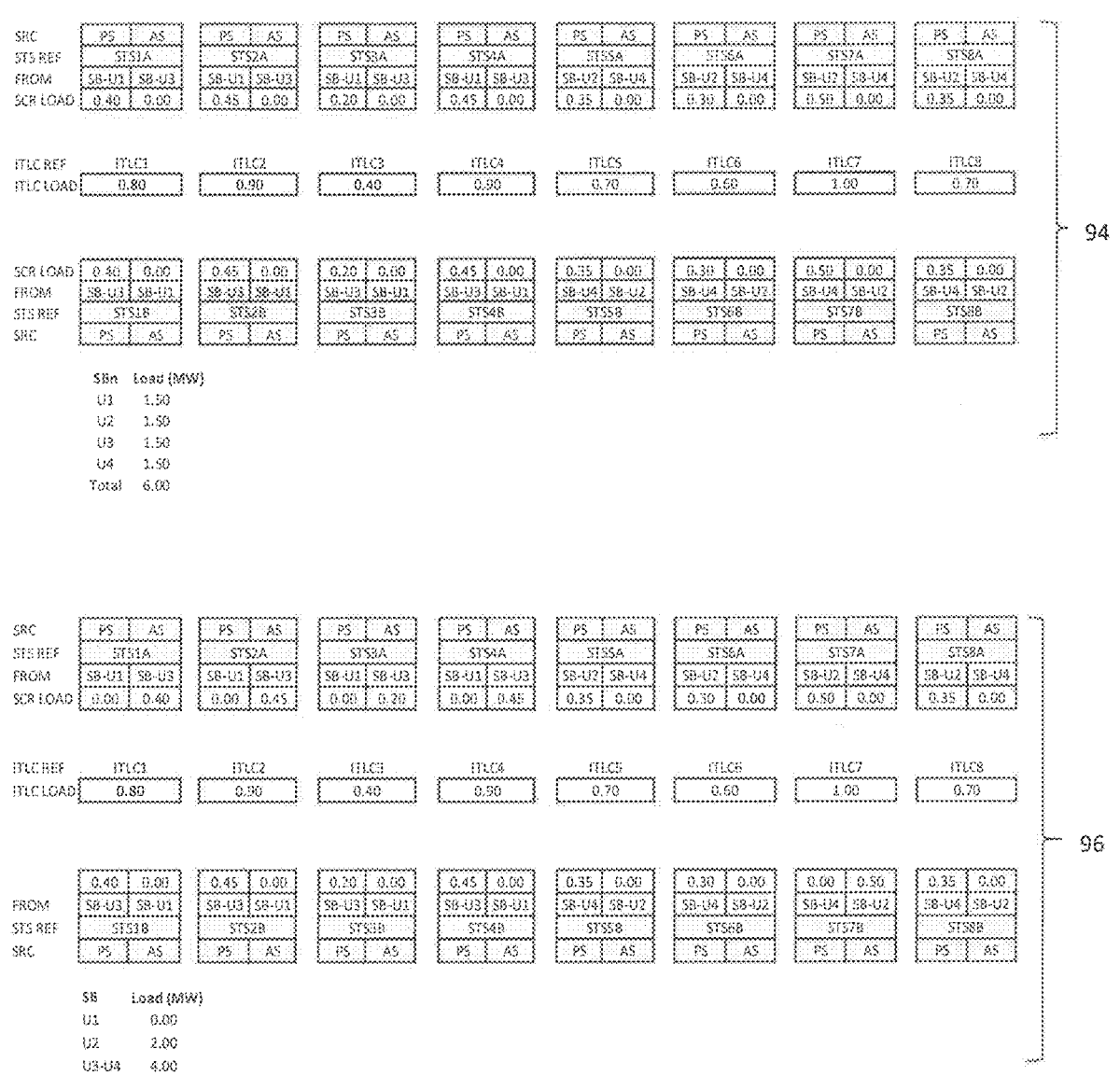
Figure 14:
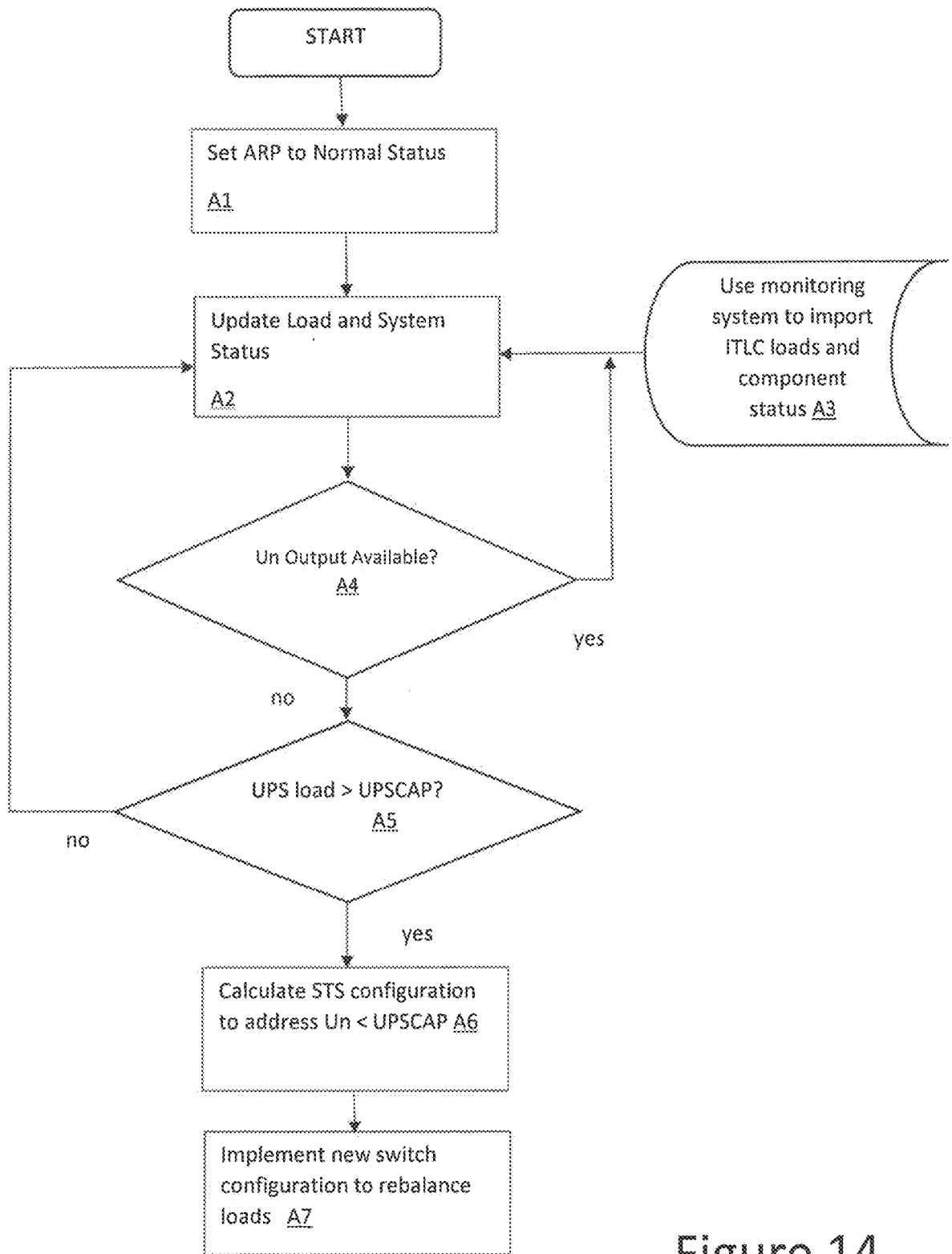
FIG. 14 depicts a flow diagram of a process of implementing an IR mode manager, in accordance with an illustrative embodiment.

As can be seen, the maximum actual load ($M_{act}$) increases from 4 MW to 6 MW. FIG. 13 illustrates two scenarios for the system of FIG. 12. Scenario 94 illustrates normal operation of an arbitrary uneven ITLC load distribution (e.g, ILTC1=0.80, ILTC2=0.90, etc.) and total ITLC load equal to $M_{act}$, 6 MW in this case. Consider a short circuit at SB-U1. This requires the bus-tie circuit breaker 90 connecting SB-U1 and SB-U2 to disconnect (typically within half a cycle) to maintain power to the ITLCs. As shown in scenario 96 of FIG. 13 in which U1 is at 0.00, to prevent U2 from overloading, IR mode manager 26 commands the STSs to redistribute the load such that the load on SB-U2 is reduced to 2 MW. In this example, IR mode manager 26 achieves the redistribution of power to the ITLC loads by controlling the STSs as follows:

STS1A: PS set to U1, transfer to AS enabled
STS1B: PS set to U3, AS transfer disabled
STS2A: PS set to U1, transfer to AS enabled
STS2B: PS set to U3, AS transfer disabled
STS3A: PS set to U1, transfer to AS enabled
STS3B: PS set to U3, AS transfer disabled
STS4A: PS set to U1, transfer to AS enabled
STS4B: PS set to U3, AS transfer disabled
STS5A: PS set to U2, AS transfer disabled
STS5B: PS set to U4, AS transfer disabled
STS6A: PS set to U2, AS transfer disabled
STS6B: PS set to U4, AS transfer disabled
STS7A: PS set to U2, AS transfer disabled
STS7B: Force transfer from PS to AS and latch
STS8A: PS set to U2, AS transfer disabled
STS8B: PS set to U4, AS transfer disabled FIG. 14 depicts a flow diagram of a process that utilizes IR to convert a 2N system to an N+1 system involving a single unavailable DPM. At A1, ARP management system 18 is set to normal status, and at A2 load and system status is updated using monitoring system 35 that imports loads and statuses at A3. At A4, a determination is made whether Un output is available (i.e., no failure). If available, the process of updating the load/system statuses repeats. If not (i.e., a failure is detected at A4), then a determination is made whether the DPM load exceeds the DPM cap at A5. If no, the process of updating the load/system statuses repeats at A2. If yes at A5, then IR mode manager 26 calculates and resolves a switch configuration to address the Un<DPM CAP A6. At A7, the switch configuration is implemented to rebalance the loads until the off-line DPM is fixed.

Figure 15:
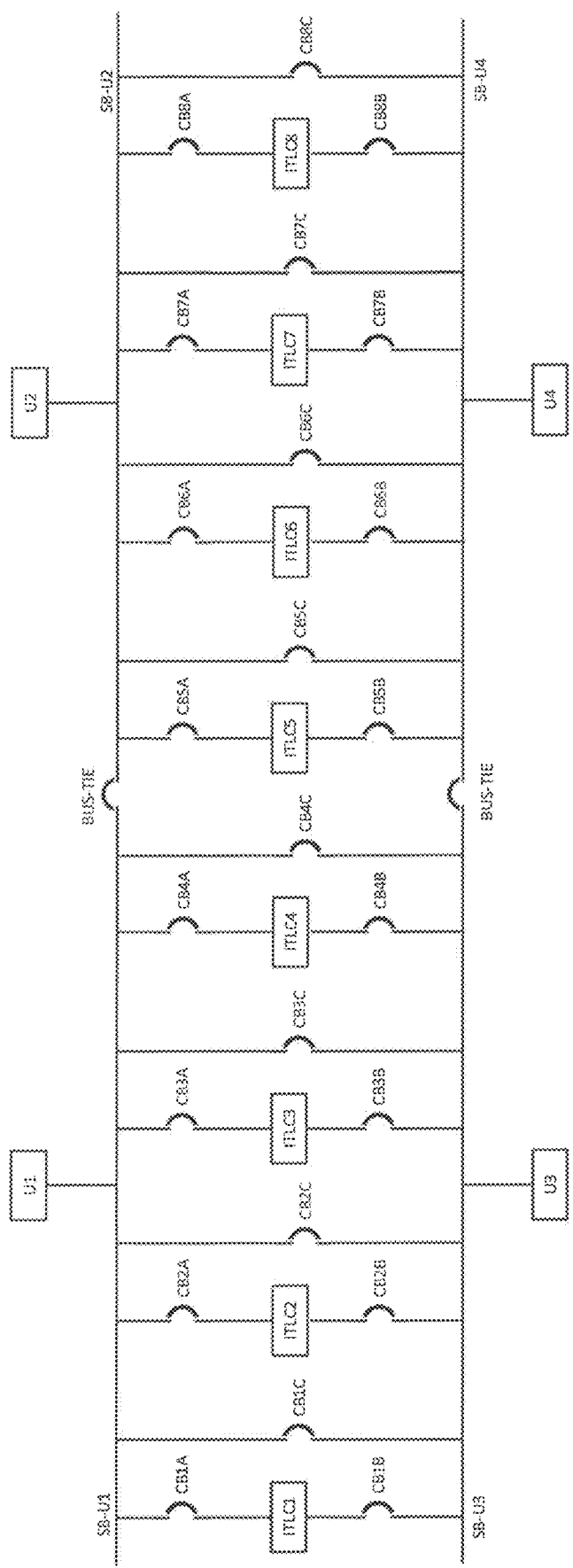
FIG. 15 depicts an alternative configuration of FIG. 12 using circuit breakers, in accordance with an illustrative embodiment.

FIG. 15 depicts an equivalent infrastructure using solid state circuit breakers (e.g., CB1A, CB2A, etc.) to replace STS switches.

Figure 16:
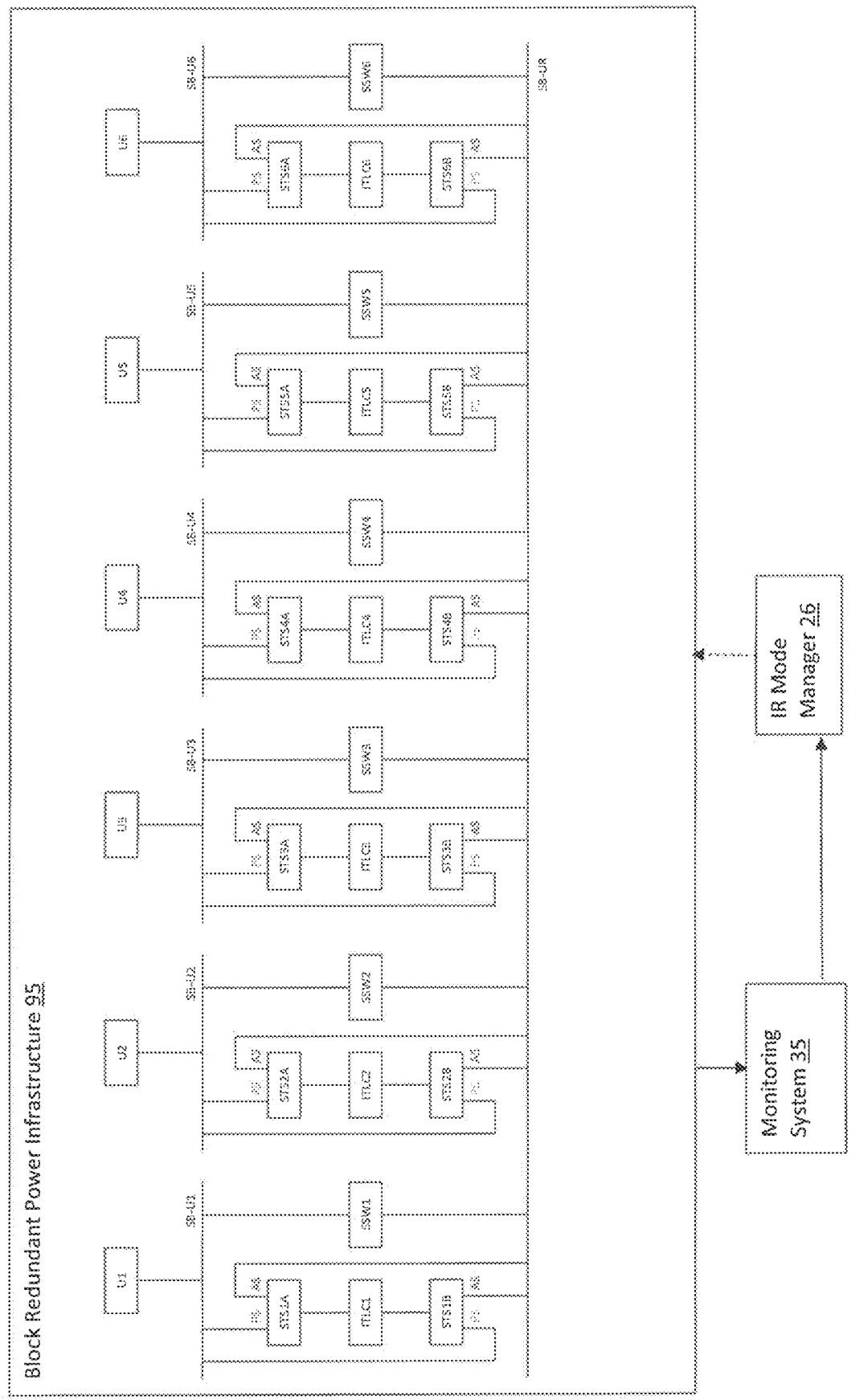
FIG. 16 depicts a further block redundant power infrastructure managed by an IR mode manager, in accordance with an illustrative embodiment.

FIG. 16 depicts a further IR power infrastructure 95 for a 1-of-6 block redundant system. In this example, N+1 DPM redundancy is derived from the unused power capacity in the DPM modules U1 to U6. The example assumes the following:

U1 to U6 are DPMs, each rated at 1 MW
DPM redundancy is N+1
$C_{max}$=6 MW
$L_{max}$=1.0 MW
$\lambda$=1

Arbitrary loads ($L_{act}$) assigned to ITLCs are shown in FIG. 17. The arbitrary total load of the system is 4.2 MW, and associated load distribution (MW) during normal operations are shown in scenario 100. Static switches SSW1 to SSW6 are open during normal operation. From the equations above, $U_{max}$=83.3% and $M_{act}$=5 MW.

Consider an event where U1 output is unavailable, as shown in scenario 102. ITLC1 requires 0.8 MW of redundant power. The IR mode manager 26 could derive 0.8 MW from SSW2 and SSW5 as follows:

SSW1: off
SSW2: on
SSW3: off
SSW4: off
SSW5: on
SSW6: off
STS1A: PS set to U1, AS transfer enabled
STS1B: PS set to U1, AS transfer enabled
STS2A: PS set to U2, AS transfer disabled
STS2B: PS set to U2, AS transfer disabled
STS3A: PS set to U3, AS transfer disabled
STS3B: PS set to U3, AS transfer disabled
STS4A: PS set to U4, AS transfer disabled
STS4B: PS set to U4, AS transfer disabled
STS5A: PS set to U5, AS transfer disabled
STS5B: PS set to U5, AS transfer disabled
STS6A: PS set to U6, AS transfer disabled
STS6B: PS set to U6, AS transfer disabled Adaptable and inherent redundancy (AIR) mode combines the functionality of AR mode and IR mode to automatically provision the redundancy configuration of the power infrastructure supporting the ITLCs with either a single level or multiple levels of redundancy. AIR mode can be achieved by either partitioning a predetermined percentage of inherent redundancy and discreet redundant components' capacity or by allocating the entire capacity of inherent redundancy or certain discreet redundant components. In all instances, individual ITLCs are assigned predetermined redundant power configurations. The AIR redundancy configuration set-points can be adjusted to automatically change the ITLC redundancy configuration to suit end-user requirements.

Figure 18:
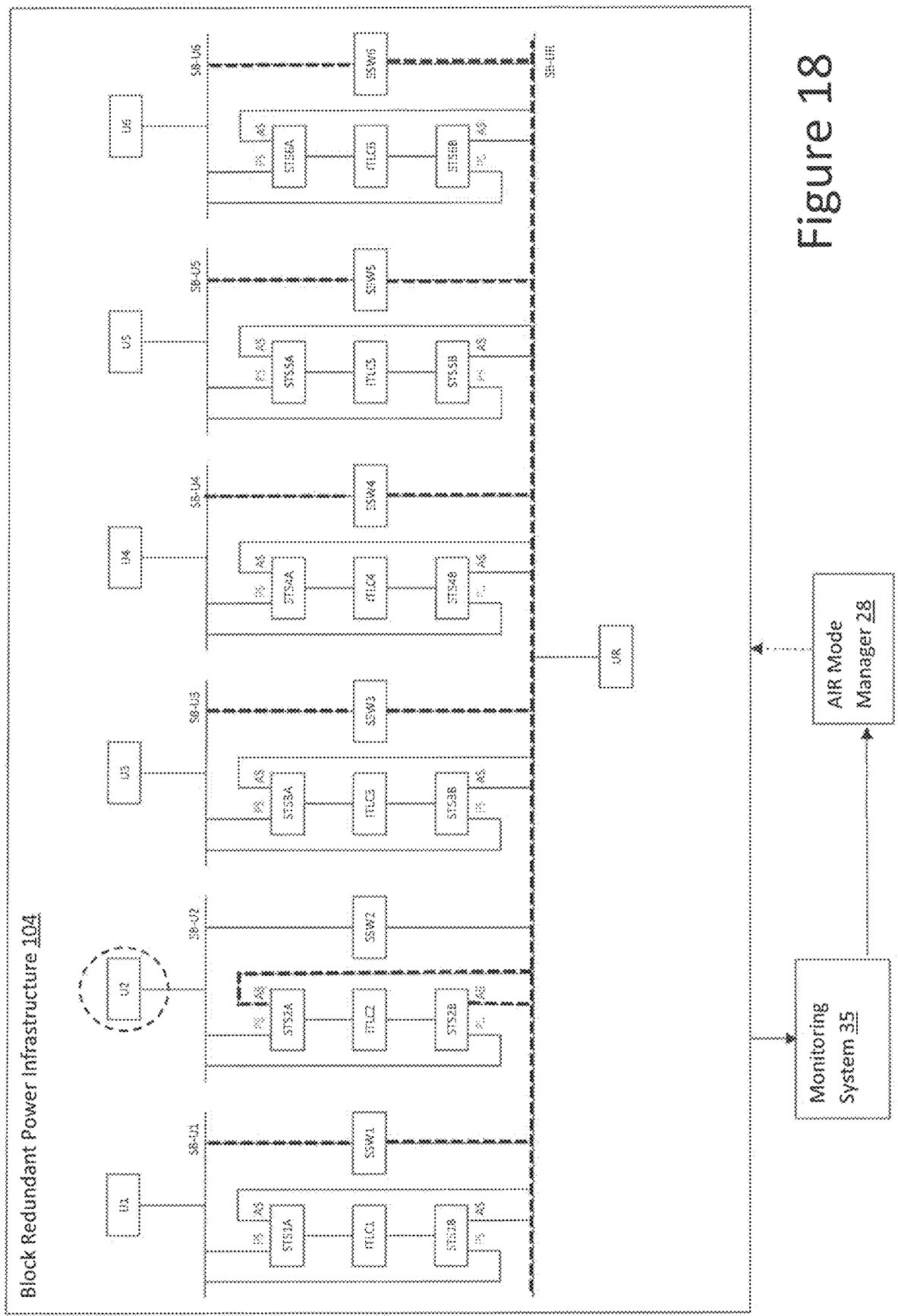
FIG. 18 depicts a block redundant power infrastructure managed by an AIR mode manager, in accordance with an illustrative embodiment.

Consider the AIR power infrastructure 104 shown in FIG. 18 in which AIR is applied to a modified N+1 Block Redundant system with six DPM modules (U1-U6). The example assumes the following:

U1 to U6 are DPMs, each rated 1 MW
UR is the RDPM rated 1 MW
$C_{max}$=6 MW
$C_{pwr}$=1 MW
$L_{act}$=1 MW
STS PS is connected to the DPM via its sub-board, SB-n
STS AS is connected to the RDPM via SB-UR
The connection of each DPM to SB-UR is controlled by AIR mode manager 28 using static switches (SSW1 to SSW6). The infrastructure is required to provide DPM redundancy to the ITLCs as shown in Table B:

TABLE B

| ITLC | Redundancy |
| --- | --- |
| 1 | 2N |
| 2 | N + 1 |
| 3 | N + 1 |
| 4 | N + 1 |
| 5 | N + 1 |
| 6 | N + 1 |

The application of AIR to a Block Redundant system requires both inherent redundant power and adaptable redundant power to be distributed to the ITLCs via SB-UR. In one example, N+1 redundancy is required for ITLC2, ITLC3, ITLC4, ITLC5 and ITLC6, which is provided as follows:

N+1 redundancy to ITLC2, ITLC3, ITLC4, ITLC5 and ITLC6 is derived from the DPM;
2N redundancy to ITLC1 provided by the RDPM; and
The upper utilization limit (Umax) for a 6-module N+1 Block Redundant system is 83.3%. Therefore, as long as the aggregated sum of the ITLC maximum power is less than 83.3% of $C_{max}$, the DPM's collectively will always be capable of providing N+1 inherent redundant power using the collectively unused DPM capacity. For an AIR Block Redundant system to access inherent power, the DPMs must be connected to SB-UR. In this example, this is achieved using static switches (SSW1-SSW6) connected between each DPM output and SB-UR. Scenario 104 shown in FIG. 19 shows the system is operating at maximum capacity in normal operating mode with a random load distribution.

In the event U2 is unavailable (as shown in dotted lines of FIG. 12 and scenario 106 of FIG. 19), AIR mode manager 28 will provide 0.9 MW to ITLC2 by diverting inherent power from DPM U1, U3, U4, U5 and U6. UR provides 2N redundancy to ITLC1. AIR mode manager 28 could control the STS and Static Switches as follows:

SSW1: on
SSW2 off
SSW3: on
SSW4: on
SSW5: on
SSW6: on
STS1A: PS set to U1, AS transfer disabled
STS1B: PS set to U1, AS transfer disabled
STS2A: PS set to U2, AS transfer enabled
STS2B: PS set to U2, AS transfer enabled
STS3A: PS set to U3, AS transfer disabled
STS3B: PS set to U3, AS transfer disabled
STS4A: PS set to U4, AS transfer disabled
STS4B: PS set to U4, AS transfer disabled
STS5A: PS set to U5, AS transfer disabled
STS5B: PS set to U5, AS transfer disabled
STS6A: PS set to U6, AS transfer disabled
STS6B: PS set to U6, AS transfer disabled The AIR redundancy configuration can subsequently be easily changed to suit future changes in ITLC redundancy requirements by reconfiguring AIR redundancy set points.

Damage limitation (DL) mode is intended for use where each ITLC has a priority ranking based on its functional importance and in circumstances where a failure or multiple simultaneous failures of components or distribution paths occur. In such cases, the residual power available in the system after the failures may be insufficient to support all ITLCs and may result in a total loss of power to the whole power system. DL mode manager 30 will instruct the STSs and SSWs to, e.g., disconnect lower priority ITLCs and divert power capacity, which would otherwise feed the lower priority ITLCs, to the higher priority ITLCs.

Figure 20:
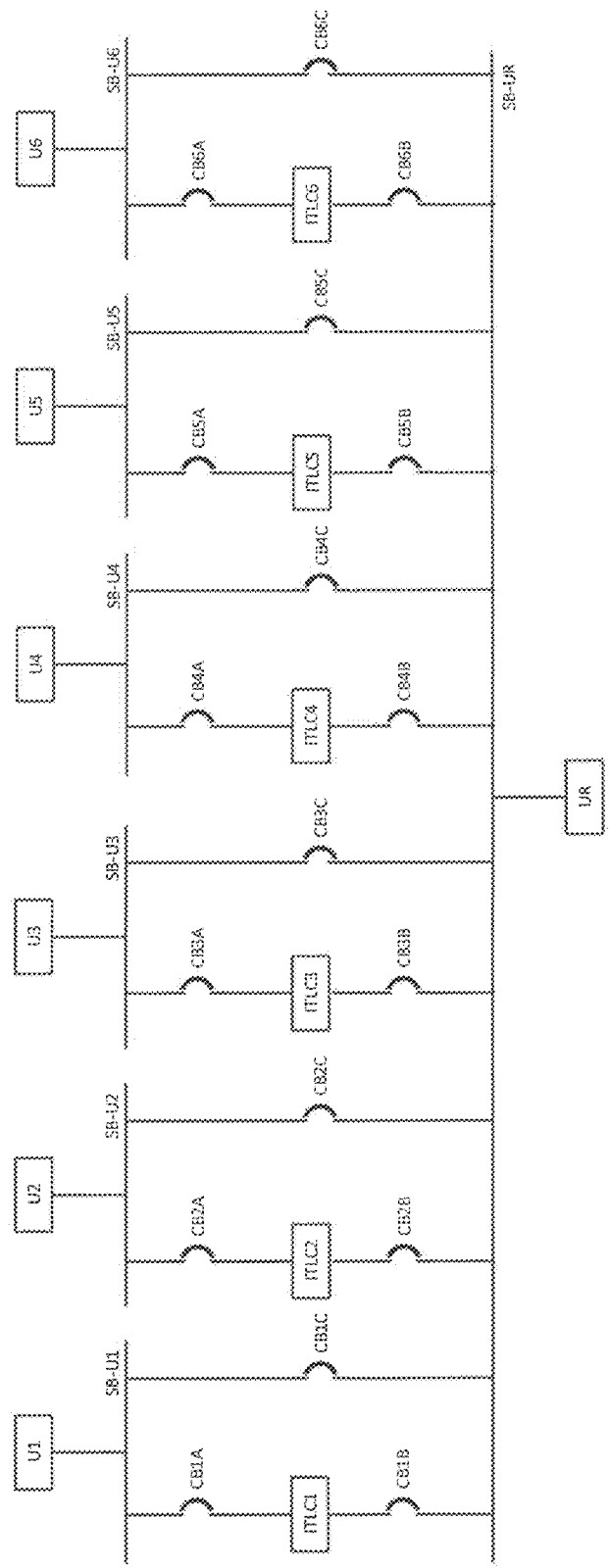
FIG. 20 an alternative configuration of FIG. 18 using circuit breakers, in accordance with an illustrative embodiment.

FIG. 20 depicts an equivalent example of and AIR application using solid state circuit breakers instead of STS switches.

Figure 21:
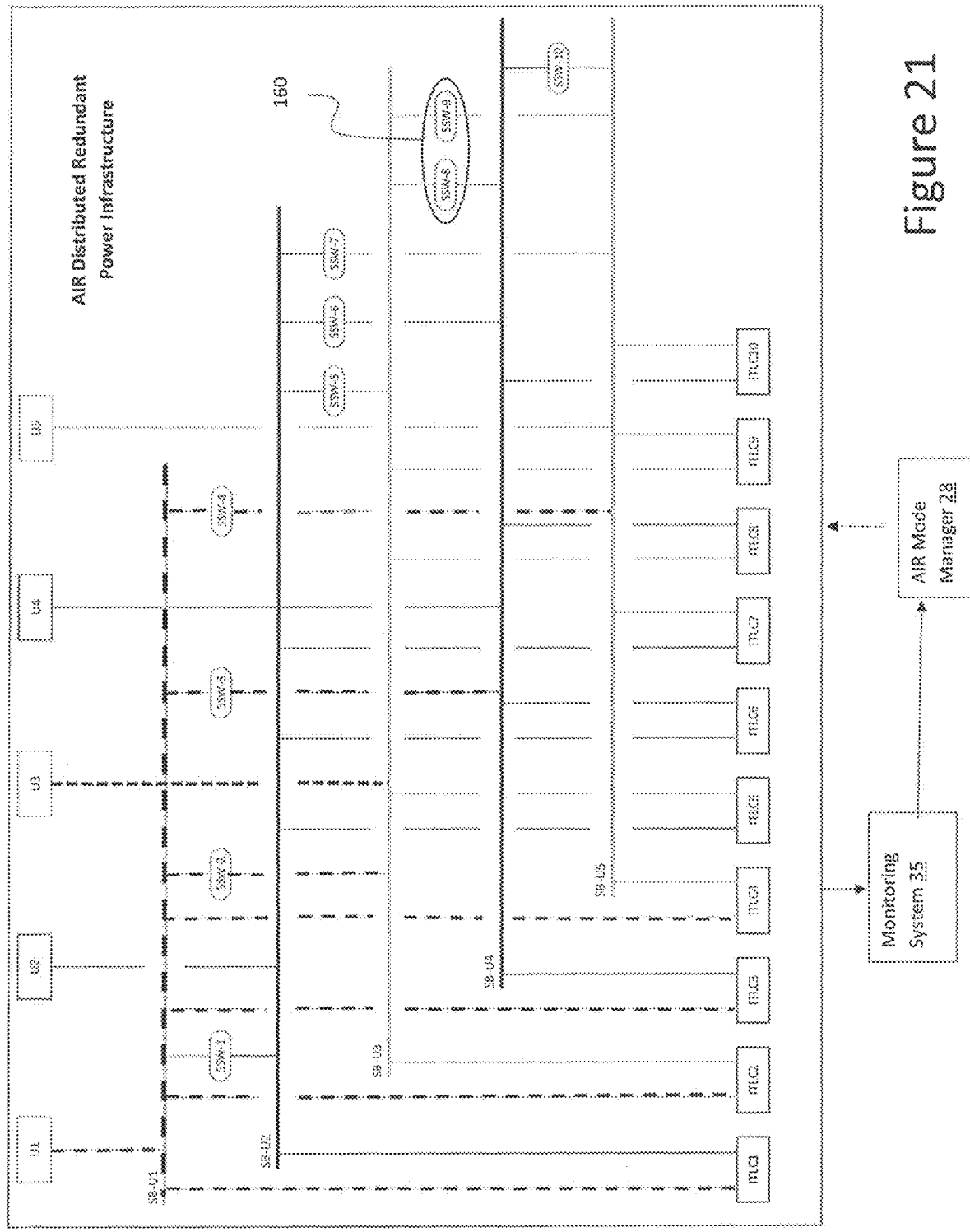
FIG. 21 depicts a distributed redundant power infrastructure managed by an AIR mode manager involving a 5-to-4 distributed redundant system using SSWs, in accordance with an illustrative embodiment.

FIG. 21 depicts an AIR application involving a 5-to-4 distributed redundant system using SSWs. This example illustrates AIR applied to a modified N+1 Distributed Redundant system with five DPMs.

The example assumes the following:
U1 to U5 are DPMs, each rated 1 MW
DPM redundancy is N+1
Cmax=4 MW
Lmax=0.8 MW
Arbitrary loads (Lact) assigned to ITLCs are shown in tables 150, 152, 154 of FIG. 22. The arbitrary total load of the system is 3 MW and associated load distribution (MW) under normal conditions is shown in table 150.

The connection of each DPM to alternative SB-Un is controlled by ARP using static switches (SSW1 to SSW10). The power system is required to provide DPM redundancy to the ITLCs as stated in the following table.

| ITLC | Redundancy |
|---|---|
| 1 | 2N |
| 2 | N + 1 |
| 3 | N + 1 |
| 4 | N + 1 |
| 5 | N + 1 |
| 6 | N + 1 |
| 7 | N + 1 |
| 8 | N + 1 |
| 9 | N + 1 |
| 10 | N + 1 |

The application of AIR to a Distributed Redundant system requires both inherent redundant power and adaptable redundant power to be distributed to the ITLCs via SB-Un's.

Figure 22:
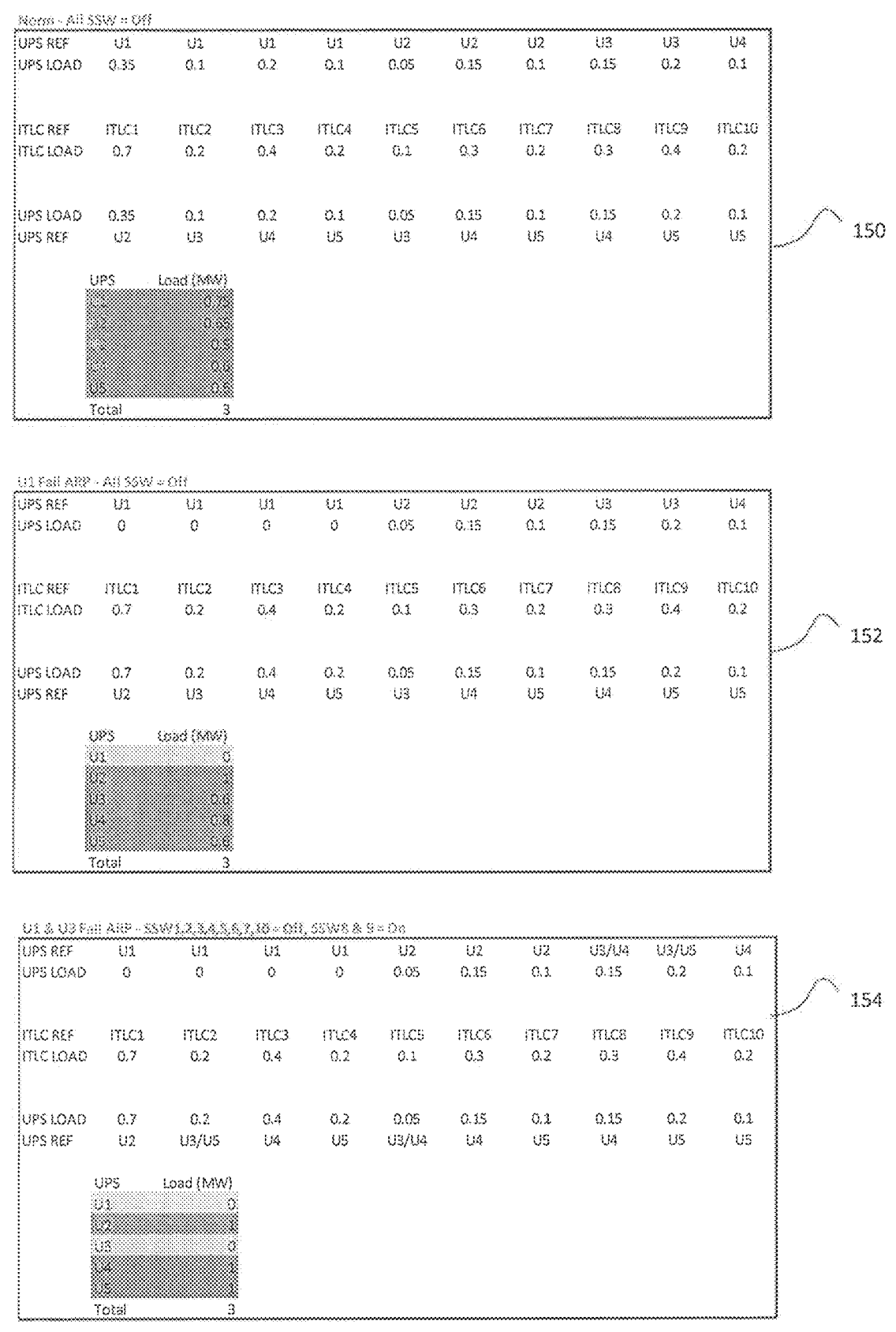

In this example, N+1 redundancy is required for ITLC2, ITLC3, ITLC4, ITLC5, ITLC6, ITLC7, ITLC8, ITLC9 and ITLC10. This is provided as follows: N+1 redundancy to ITLC2, ITLC3, ITLC4, ITLC5, ITLC6, ITLC7, ITLC8, ITLC9 and ITLC10 is derived from the inherent redundancy within the distributed redundant system. 2N redundancy to ITLC1 provided by DPM U1 and U2. The upper utilization limit (Umax) for a 5-module N+1 Block Redundant system is 80%. Therefore, on condition the aggregated sum of the ITLC maximum power is less than 80% of Cmax, the DPM collectively will always be capable of providing N+1 inherent redundant power using the collectively unused DPM capacity. For an AIR Distributed Redundant system to access inherent power each SB-Un must be interconnected. In this example this is achieved using static switches (SSW-n) connected between each duty SB-Un. The table 150 shown in FIG. 22 shows the system is operating in normal operating mode with a random load distribution, and none of the static switches are active.

In the event U1 is unavailable, the distributed redundant system will operate without intervention using monitoring system 35 and AIR mode manager as follows. As shown via the dashed lines in FIG. 21, when U1 is unavailable, ITLC1-4 are directly impacted. The result is reflected in table 152 of FIG. 22.

In the event, U1 is unavailable and U3 fails the system will provide power to ITLC2, ITLC5, ITLC8 and ITLC9 by diverting inherent power from DPMs U4 via SSW-8 and U5 via SSW-9 as shown by reference number 160 in FIG. 21 whilst still maintaining ITLC1. The resulting load distribution for this case is shown in table 154 of FIG. 22. For a failure involving U1 and U3, AIR mode manager 28 would thus use the following Static Switching pattern:

SSW1: off
SSW2: off
SSW3: off
SSW4: off
SSW5: off
SSW6: off
SSW7: off
SSW8: on
SSW9: on
SSW10: off Further switching patterns would be provided for other DPM failure combinations in which inherent power is required.

Figure 23:
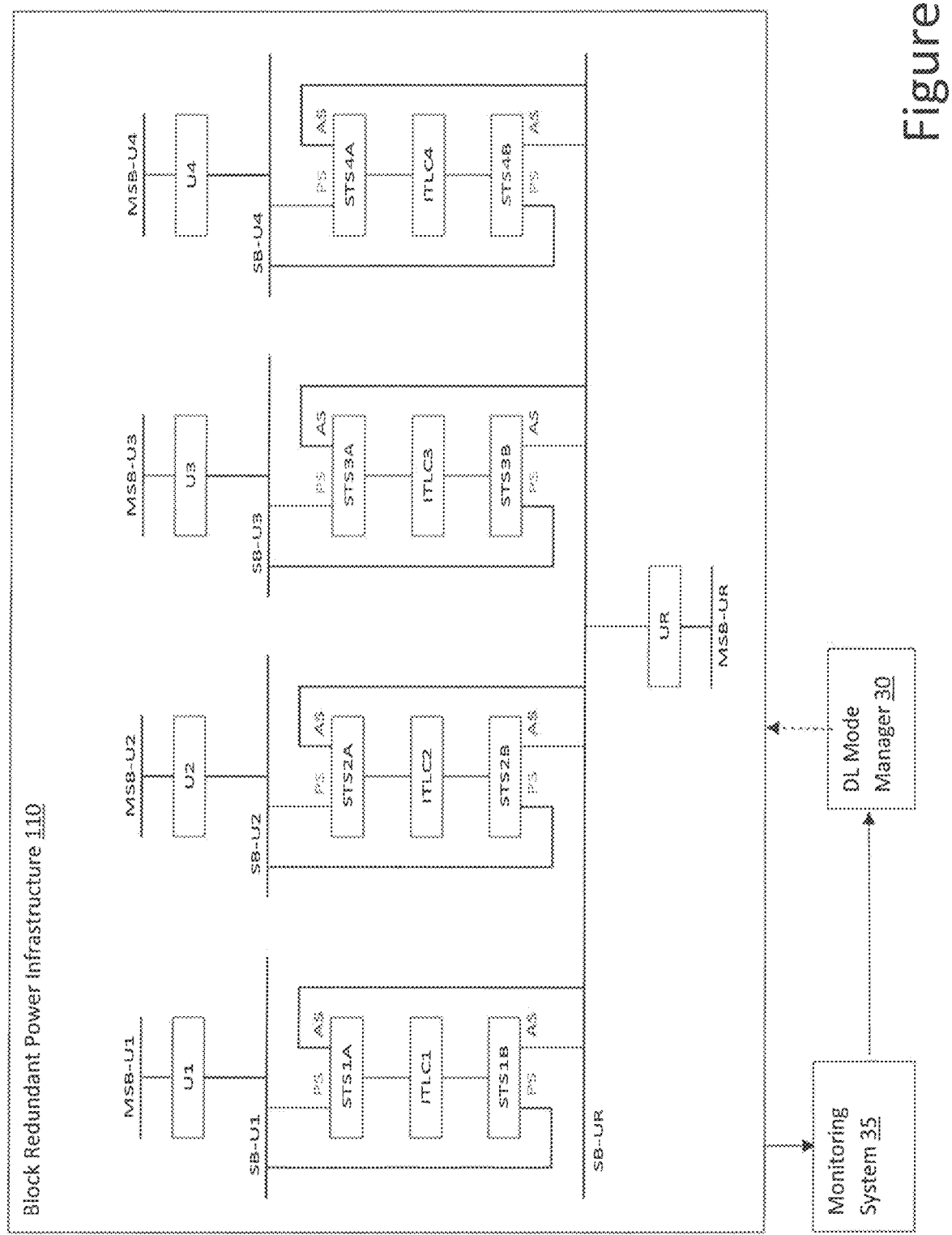
FIG. 23 depicts a block redundant power infrastructure managed by an DL mode manager, in accordance with an illustrative embodiment.
Figure 24:
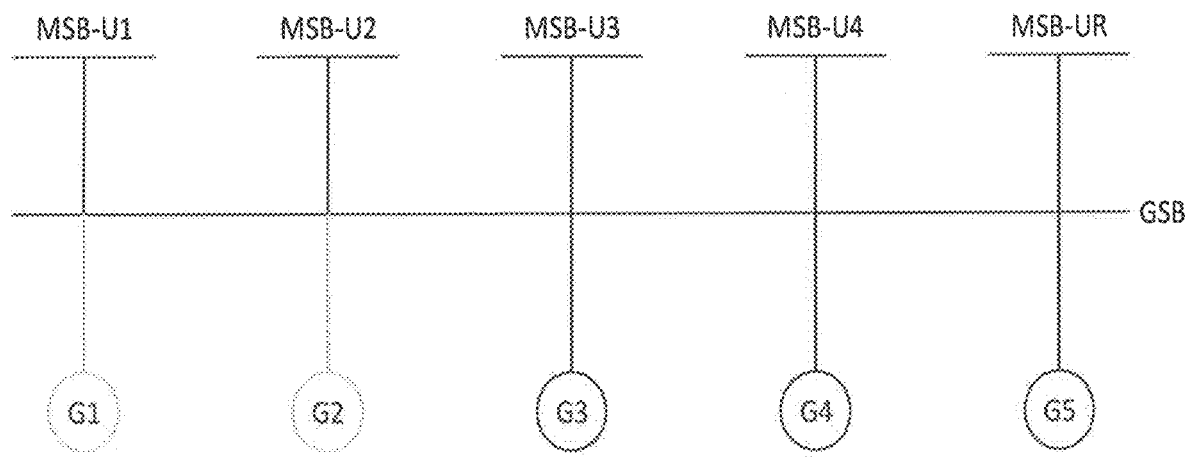
FIG. 24 depicts a set of generators for powering the power infrastructure of FIG. 23, in accordance with an illustrative embodiment.

FIG. 23 depicts a DL power infrastructure 110 having a high-level 1-of-4 Block Redundant system single line diagram supported by five parallel standby diesel generators configured with N+1 redundancy. The five standby generators G1-G5 are shown in FIG. 24 and the ITLCs are arbitrarily designated with priority ranking levels ranging from 1 to 4 with 1 being the highest priority and 4 the lowest priority.

The conventional Block Redundant system reference example assumes the following:
U1 to U4 are DPMs, each with the same capacity
UR is the reserve DPM (RDPM) with the same capacity as the DPM
Each ITLC has a design capacity equal to each DPM capacity
The ITLCs are equally loaded at full load capacity
Each STS preferred setting input is connected to its DPM input via its SB-n sub-board
The STS alternate source input is connected to the reserve DPM input via SB-UR
UR provides N+1 redundancy to the ITLCs
Each ITLC is operating at 100% capacity
G1 to G5 are standby diesel generators each with the same capacity
Each diesel generator has capacity to support one DPM maximum input load In a scenario where the utility power source is unavailable, the power infrastructure 110 is required to run entirely on standby diesel generators. During the start-up of the five diesel generators, assume G1 fails to start. The other four generators start, synchronize and share the load equally. At this stage, the overall power infrastructure 110 has no residual generator redundancy. Several minutes after G1 fails, assume G2 develops a fault and is disconnected from the generator bus (GSB) shown in FIG. 24. The failure of G1 and G2 will cause G3, G4 and G5 to overload, resulting in a power failure to all ITLCs, unless the overall ITLC load is reduced such that the reduced ITLC load can be supported by G3, G4 and G5. Given the IT load priorities stated above, to maintain power system integrity to the higher priority load centers, DL Mode Manager 30 could instruct the switches as follows. Namely, when G1 is unavailable, retain N+1 DPM and generator redundancy to ITLC1, ITLC2 and ITLC3 and change ITLC4 DPM and generator redundancy to N as follows:

STS1A: PS set to U1, AS transfer enabled
STS1B: PS set to U1, AS transfer enabled
STS2A: PS set to U2, AS transfer enabled
STS2B: PS set to U2, AS transfer enabled
STS3A: PS set to U3, AS transfer enabled STS3B: PS set to U3, AS transfer enabled
STS4A: PS set to U4, AS transfer disabled
STS4B: PS set to U4, transfer to AS disabled
When G1 and G2 are unavailable, retain N+1 DPM and generator redundancy to ITLC1 and ITLC2, change ITLC3 DPM and generator redundancy to N and disconnect ITLC4 as follows:
STS1A: PS set to U1, AS transfer enabled
STS1B: PS set to U1, AS transfer enabled
STS2A: PS set to U2, AS transfer enabled
STS2B: PS set to U2, AS transfer enabled
STS3A: PS set to U3, AS transfer disabled
STS3B: PS set to U3, AS transfer disabled
STS4A: Disconnect output to ITLC4
STS4B: Disconnect output to ITLC4

Figure 25:
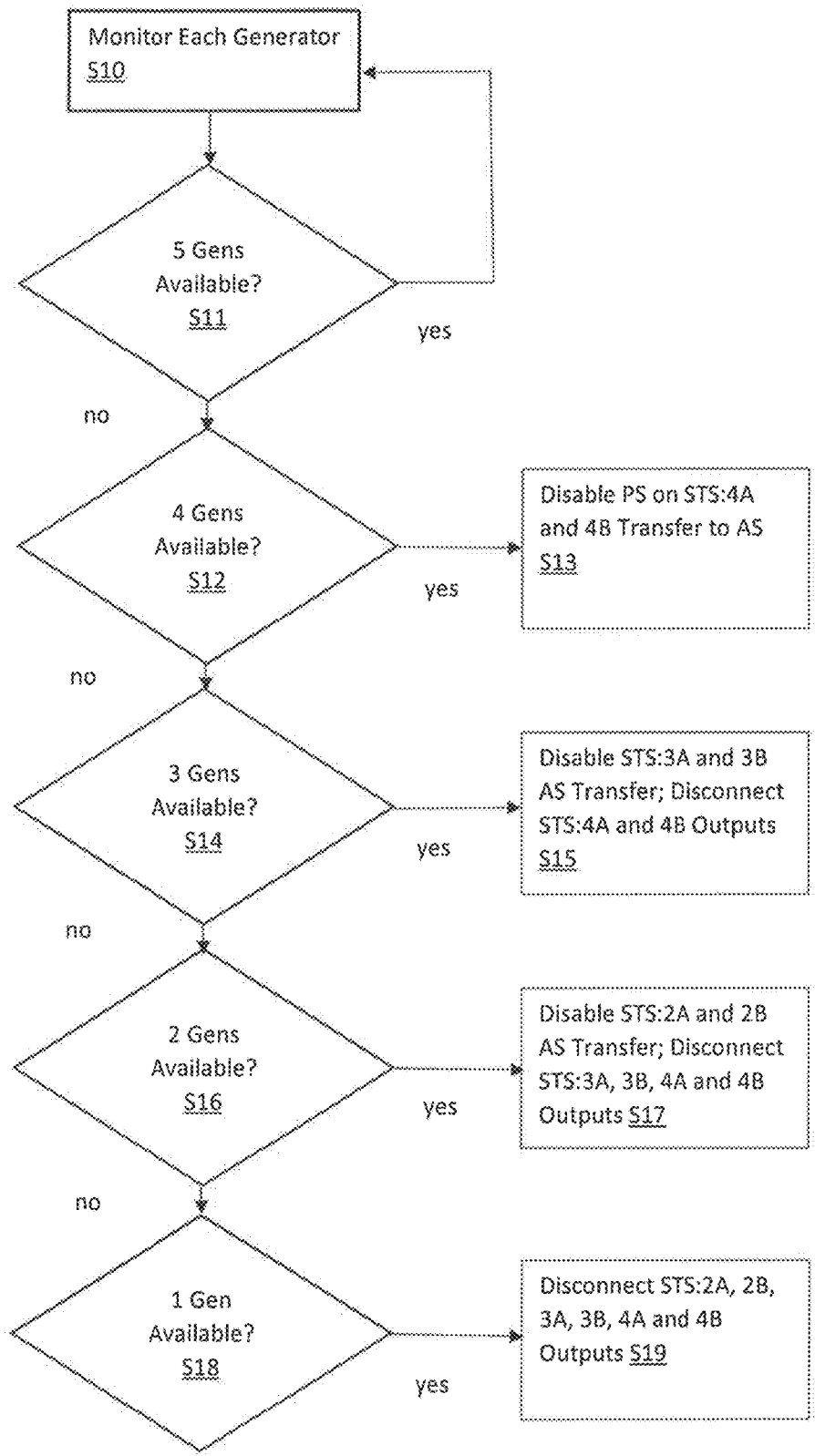
FIG. 25 depicts a flow diagram for implementing a DL mode manager, in accordance with an illustrative embodiment.

The flow diagram shown in FIG. 25 illustrates how DL mode manager could control the STS switches of FIG. 23. Each generator is monitored at S10 and at S11 a determination is made whether all of the five generators are available. If yes, the monitoring process continues. If no, a check is made to see if four generators are available. If yes, then STS4A and STS4B are transferred from PS to AS at S13. If no at S12, then a check is made to see if three generators are available. If yes, then STS3A and STS3B are transferred from PS to AS at S15, and outputs from STS4A and STS4B are disconnected (shutting done ITLC4). If no at S14, then a check is made to see if two generators are available. If yes, then STS2A and STS2B are transferred from PS to AS at S17, and outputs from STS3A, STS3B, STS4A and STS4B are disconnected (shutting done ITLC3 and ITLC4). If no at S16, then a check is made to see if one generator is available. If yes, then at S19, and outputs from STS2A, STS2B, STS3A, STS3B, STS4A and STS4B are disconnected (shutting done ITLC2, ITLC3 and ITLC4).

Figure 26:
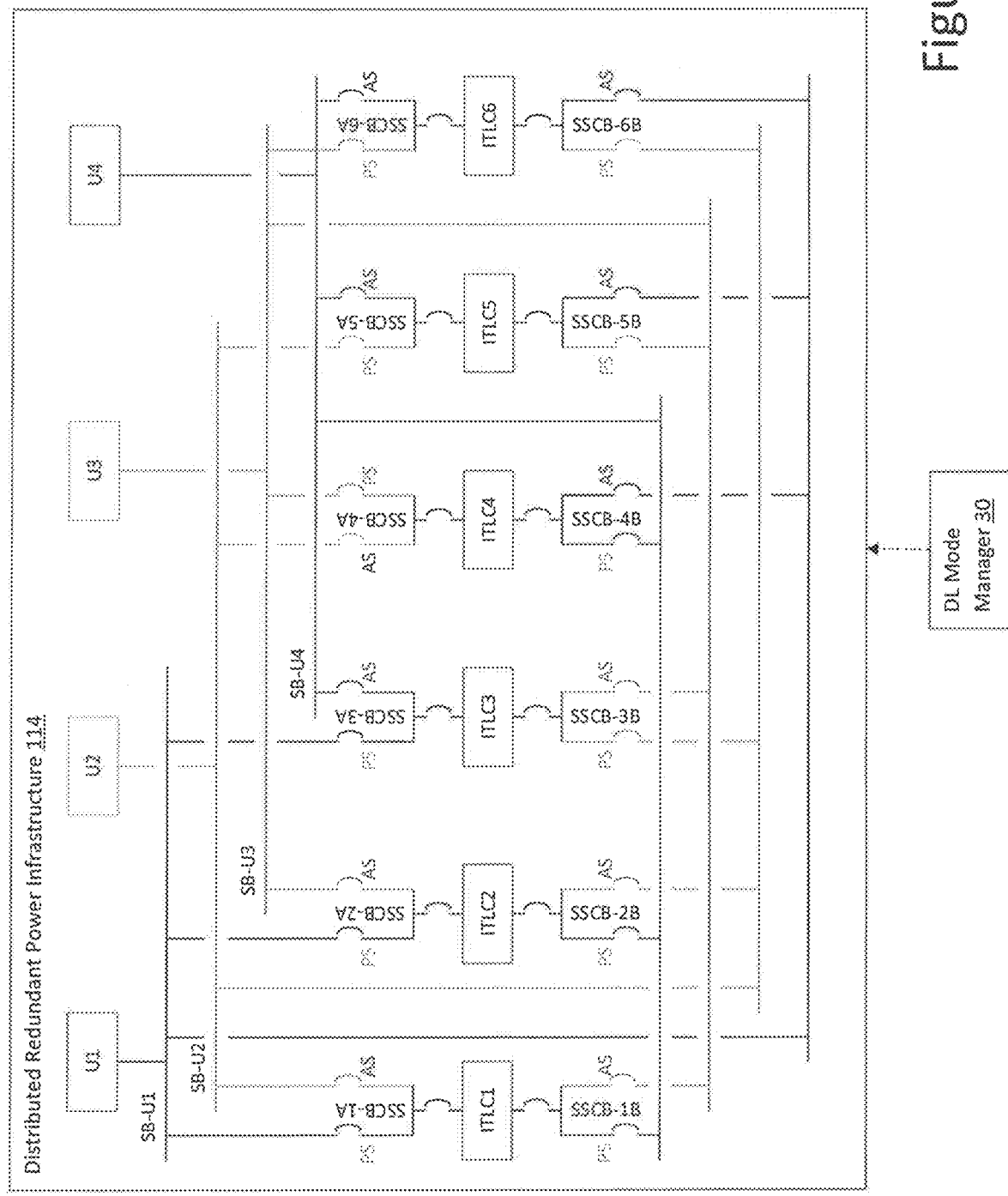
FIG. 26 depicts a power infrastructure using solid state switches managed by an DL mode manager, in accordance with an illustrative embodiment.

FIG. 26 depicts a DL distributed redundant power infrastructure 114 example involving a high-level 4-to-3 Distributed Redundant system. ITLCs are arbitrarily designated with priority ranking levels 1 to 6; with 1 being the highest priority and 6 the lowest priority.

The conventional Distributed Redundant system reference example assumes the following:
U1 to U4 are DPMs, each with the same capacity
DPM redundancy is N+1
Each SSCB preferred setting input is connected to its s input via its SB-n bus
The ITLCs alternate source input is connected to an alternative DPM input via SB-n bus
Solid-State Circuit Breakers configured as ATS
The ITLCs are equally loaded at full load capacity In this example, assume DPM U1 develops a fault and is disconnected from the bus. At this stage, the overall power infrastructure 114 has no DPM redundancy. Several minutes after DPM U1 developed a fault, DPM U2 develops a fault and is disconnected from the bus. The failure of U1 and U2 will cause U3 and U4 to overload, resulting in a power failure to all ITLCs, unless the overall ITLC load is reduced such that the ITLC load can be supported by U3 and U4. Given the IT load priorities stated above, to maintain power system integrity to the higher priority load centers, DL Mode manager 30 could instruct the solid-state-circuit breakers as follows:
When U1 is unavailable:
SSCB1A: PS set to U1, transfer to AS enabled
SSCB1B: PS set to U4, AS transfer enabled
SSCB2A: PS set to U1, transfer to AS enabled
SSCB2B: PS set to U4, AS transfer enabled
SSCB3A: PS set to U1, transfer to AS enabled
SSCB3B: PS set to U2, AS transfer enabled
SSCB4A: PS set to U3, AS transfer enabled
SSCB4B: PS set to U4, AS transfer disabled
SSCB5A: PS set to U2, AS transfer enabled
SSCB5B: PS set to U3, AS transfer disabled
SSCB6A: PS set to U3, AS transfer enabled
SSCB6B: PS set to U2, AS transfer disabled
When both U1 and U2 are unavailable:
SSCB1A: disabled
SSCB1B: PS set to U4, AS transfer enabled
SSCB2A: PS set to U1, transfer to AS enabled
SSCB2B: PS set to U4, AS transfer disabled
SSCB3A: PS set to U1, transfer to AS enabled
SSCB3B: PS set to U2, transfer to AS enabled
SSCB4A: PS set to U3, AS transfer disabled
SSCB4B: PS set to U4, AS transfer disabled
SSCB5A: PS set to U2, Disconnect output to ITLC5
SSCB5B: PS set to U3, Disconnect output to ITLC5
SSCB6A: Disconnect output to ITLC6
SSCB6B: Disconnect output to ITLC6

Figure 27:
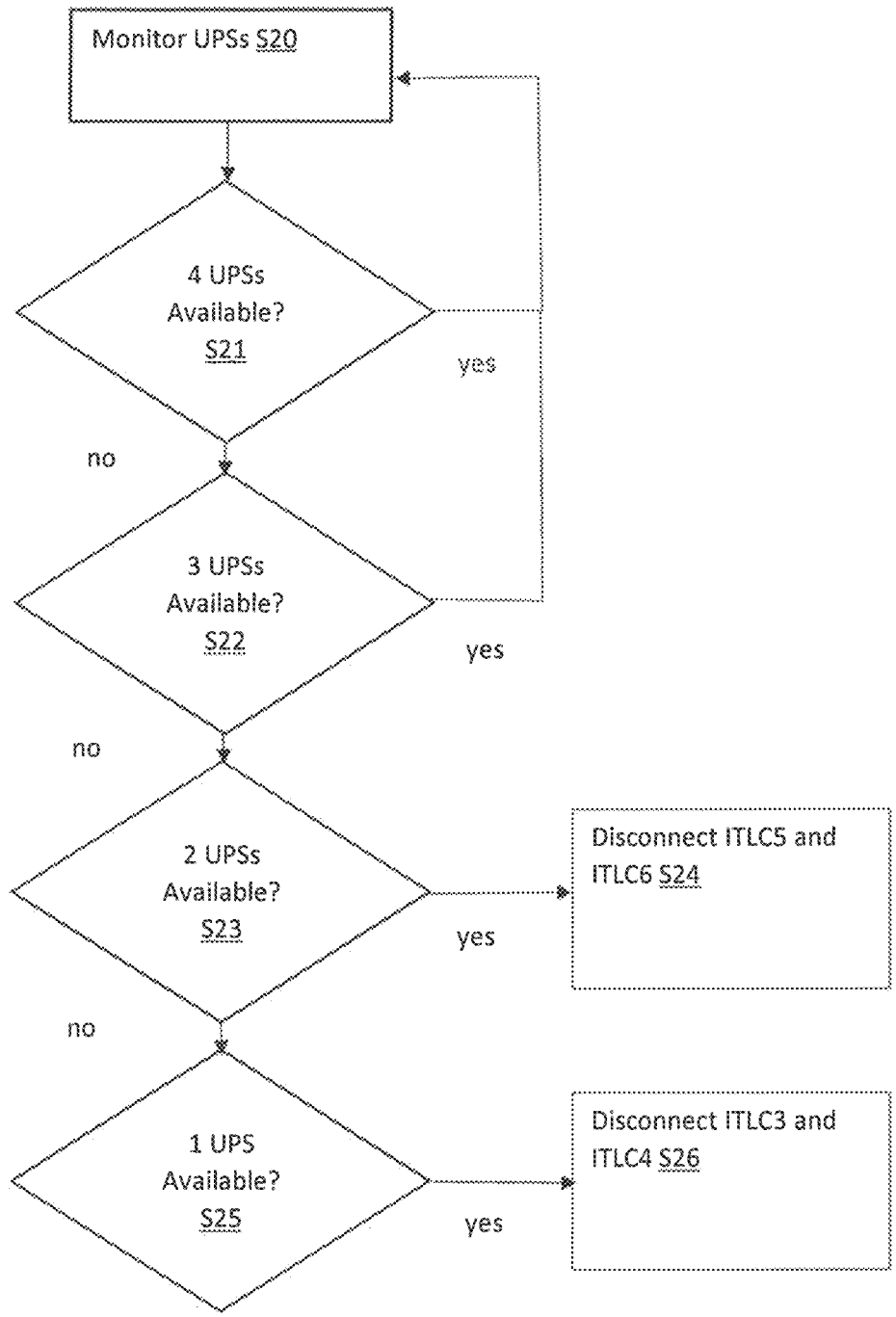
FIG. 27 depicts a flow diagram for implementing a DL mode manager, in accordance with an illustrative embodiment.

FIG. 27 is high-level flow diagram that illustrates how the DL Mode Manager 30 can control the solid-state-circuit-breakers of FIG. 26. DPMs U1-U4 are monitored at S20, and at S21 a determination is made whether all four DPMs are available. If yes, the process repeats. If no, a determination is made whether three DPMs are available at S22. If yes, the process repeats. If no, a determination is made whether two DPMs are available at S23. If yes, then ILTC5 and ILTC6 are disconnected at S24. If no, a determination is made whether one DPM is available at S25. If yes, then ILTC3 and ILTC4 are disconnected at S24.

ARP management system 18 (FIG. 1) generally comprises hardware, software and communications sub-systems that continuously monitors the power infrastructure components and can act as the overarching controller of specific components. During normal operating conditions the power system operates autonomously without ARP management system 18 intervention. However, during certain abnormal operating conditions ARP management system 18 will override autonomous control of the certain power infrastructure components.

The ARP management system 18 monitors the electrical characteristics of key power system components during normal and abnormal conditions. The results are converted into digital numeric values that are used by the ARP management system 18 to control the operation of specific power system components, such as STS, SSW and SSCB switches.

As shown in FIG. 28, various components shown along the top (e.g., standby generator, main switchboard, etc.) can be monitored for various conditions shown along the side (e.g., Steady State V, I an f, Short Circuit, etc.). Some entries may be monitored, not monitored, or monitored and controlled, as shown. FIG. 29 shows how automated inputs from different data center components are received by the ARP management system 18 and then analyzed. Based on the analysis, outputs are sent back to the components, to alter switches, etc.

The ARP management system 18 should have the same or higher degree of reliability and availability as the power infrastructure 34 it is controlling. There are established methods for achieving fault tolerant hardware such as triple modular redundancy and design diversity. The most appropriate method of hardware resilience should be determined the based upon the reliability and availability of the power system required for the specific ARP application. Subject to the power system reliability and availability requirements, the appropriate approach to ARP firmware resilience such as N-Version programming or independent application development should be determined.

ARP uses switching devices such as STS, SSW, SSCB, ATS to manage power distribution by controlling load flow quantum and direction. While an ARP command is present at the switching device, for example an STS must disable autonomous transfer. Instructions from ARP management system 18 must take precedence over autonomous switching commands. The ARP management system 18 instructs switching devices to either transfer and latch source inputs, latch existing source inputs or disconnect its output to the ITLC. The power infrastructure 34 must remain under ARP control until ARP sends a System Normal instruction to the switching device. During normal operating conditions, where ARP does not issue a source transfer and latch or source latch instruction, the switching device operates autonomously.

When ARP management system 18 commands a switching device to transfer between its source inputs, the overall data acquisition, processing, transfer and latching time for the switching device to complete a transfer between source inputs are within the ITLC equipment power supply tolerances.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Each of the client computing system 10, cloud service 30 and back-end service 40 may comprise any type of computing device that for example includes at least one processor, memory, an input/output (I/O), e.g., one or more I/O interfaces and/or devices, and a communications pathway or bus. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or DPM thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An adaptable redundant power (ARP) platform, comprising:
    a power infrastructure having:
        a plurality of duty power module (DPMs) configured to power a plurality of load centers, wherein each load center includes a unique load center switch coupled between the load center and an associated DPM, and wherein each of the DPMs are physically independent of each other and provides power to at least one load center during normal operations via the unique load center switch using an enabled preferred setting (PS) input, and
        an inherent redundancy (IR) bus coupled to a set of load center switches via an alternate setting (AS) input that is disabled during normal operations, wherein the IR bus is configured to receive excess capacity power directly and exclusively from a set of DPMs;

a monitoring system that monitors a first set of load values provided by each DPM and a second set of load values reflecting a maximum load utilized by each load center; and an inherent redundancy (IR) mode manager that in response to a detected DPM failure, determines a strategy to redistribute excess capacity from a set of unaffected DPMs via the IR bus to an affected load center via the AS input in the load center switch coupled to the affected load center, wherein the strategy includes analyzing the first set and second set of load values to ensure that a resulting load provided by each unaffected DMP will not exceed a maximum load value.

2. The ARP platform of claim 1, wherein each load center switch comprises at least one of a static transfer switch (STS), a static switch, a solid-state circuit breaker, a solid-state switch, an electromechanical circuit breaker and an electro-mechanical switch.

3. The ARP platform of claim 1, wherein each load center receives power from the DPMs from a pair of switches.

4. The ARP platform of claim 1,
wherein each DPM is coupled to the IR bus via an associated switch that is open during normal conditions; and
wherein, in response to a detected DPM failure, the IR mode manager determines which of the associated switches to close to power the IR bus.

5. The ARP platform of claim 1,
wherein each DPM is configured to power multiple load centers;
wherein, in response to a detected DPM failure, the IR mode manager determines if a remaining DPM exceeds a maximum load; and
wherein, in response to a remaining DPM exceeding the maximum load, the IR mode manager rebalances loads among the remaining DPMs by selectively causing at least one of the load center switches to disable the PS input and enable to AS input.

6. The ARP platform of claim 1, wherein monitoring of the power infrastructure includes monitoring at least one of: DPMs, incoming power, standby generators, MV switchgear, transformers, LV distribution, static switches, STSs and load centers.

7. The ARP platform of claim 1, further comprising a damage limitation mode manager that prioritizes load centers and disconnects lower priority load centers when multiple DPMs fail.

8. A method of managing a power infrastructure having a plurality of duty power modules (DPMs) configured to power a plurality of load centers, comprising:
providing each load center with a unique load center switch coupled between the load center and an associated DPM, wherein each DPM is physically independent of each other;
monitoring operations of the power infrastructure to collect a first set of load values provided by each DPM and a second set of load values reflecting a maximum load utilized by each load center;
powering each load center during normal operations using DPMs through via the unique load center switch via an enabled preferred setting (PS) input;
providing an inherent redundancy (IR) bus coupled to each load center switch via an alternate setting (AS) input that is disabled during normal operations,
wherein the IR bus is configured to receive excess capacity power directly and exclusively from a set of the DPMs; and in response to a detected DPM failure, determining a strategy to redistribute excess capacity from a set of unaffected DPMs via the IR bus to an affected load center via the AS input in the load center switch coupled to the affected load center, wherein the strategy includes analyzing the first set and second set of load values to ensure that a resulting load provided by each unaffected DMP will not exceed a maximum load value.

9. The method of claim 8, wherein each load center receives power from the DPMs from a pair of switches.

10. The method of claim 8, wherein each load center switch comprises at least one of a static transfer switch (STS), a static switch, a solid-state circuit breaker, a solid-state switch, an electromechanical circuit breaker and an electro-mechanical switch.

11. The method of claim 8,
wherein each DPM is coupled to the IR bus via an associated switch that is open during normal conditions; and
in response to a detected DPM failure, determining which of the associated switches to close to power the IR bus.

12. The method of claim 8,
wherein each DPM is configured to power multiple load centers;
in response to a detected DPM failure, determining if a remaining DPM exceeds a maximum load; and
in response to a remaining DPM exceeding the maximum load, rebalancing loads among the remaining DPMs by selectively causing at least one of the load center switches to disable the PS input and enable to AS input.

13. The method of claim 8, wherein monitoring of the power infrastructure includes monitoring at least one of: DPMs, incoming power, standby generators, MV switchgear, transformers, LV distribution, static switches, STSs and load centers.

14. The method of claim 8, further comprising prioritizing load centers and disconnecting lower priority load centers when multiple DPMs fail.

15. An adaptable redundant power (ARP) platform, comprising:
a power infrastructure having:
a plurality of duty power modules (DPMs) configured to power a plurality of load centers, wherein each of the DPMs provides power to at least one load center during normal operations via a load center switch using an enabled preferred setting (PS) input,
at least one reserve duty power module (RDPM) for powering a reserve bus that is coupled to each load center switch via an alternate setting (AS) input that is disabled during normal operations, and
a set of static switches that couple each DPM to the reserve bus; and
an adaptable redundancy (AR) mode manager that: predefines redundancy levels for each load center based on a set of inputted configuration parameters, monitors the power infrastructure, and in response to a detected DPM failure, transfers at least one load center switch from the PS input to the AS input according to the inputted configuration parameters to achieve the predefined redundancy levels, wherein the redundancy levels include a first level that obtains redundant power from the reserve bus via the static switches and a second level that obtains redundant power from the reserve bus via the RDPM.

16. The ARP platform of claim 15, wherein each load center switch comprises at least one of a static transfer switch (STS), a static switch, a solid-state circuit breaker, a solid-state switch, an electromechanical circuit breaker and an electro-mechanical switch.

17. The ARP platform of claim 15, wherein monitoring of the power infrastructure includes monitoring at least one of: DPMs, incoming power, standby generators, MV switchgear, transformers, LV distribution, static switches, STSs and load centers.

18. The ARP platform of claim 15, further comprising a damage limitation mode manager that prioritizes load centers and disconnects lower priority load centers when multiple DPMs fail.

19. A method of managing a power infrastructure having a plurality of duty power module (DPMs) configured to power a plurality of load centers, comprising:
   inputting a set of configuration parameters that predefines redundancy levels for each load center;
   monitoring operations of the power infrastructure;
   powering each load center during normal operations using DPMs through a load center switch via an enabled preferred setting (PS) input;
   providing at least one reserve duty power module (RDPM) for powering a reserve bus that is coupled to each load center switch via an alternate setting (AS) input that is disabled during normal operations;
   providing a set of static switches that couple each DPM to the reserve bus; and
   in response to a detected DPM failure, transferring at least one load center switch from the PS input to an alternate setting (AS) input according to the inputted configuration parameters to achieve the redundancy levels, wherein the AS input causes power to be obtained from the reserve bus, wherein the redundancy levels include a first level that obtains redundant power from the reserve bus via the static switches and a second level that obtains redundant power from the reserve bus via the RDPM.

20. The method of claim 19, wherein each load center switch comprises at least one of a static transfer switch (STS), a static switch, a solid-state circuit breaker, a solid-state switch, an electromechanical circuit breaker and an electro-mechanical switch.

* * * * *